(12) United States Patent
Nishitani et al.

(10) Patent No.: US 8,783,932 B2
(45) Date of Patent: Jul. 22, 2014

(54) BACKLIGHT DEVICE AND LIQUID CRYSTAL DISPLAY APPARATUS

(75) Inventors: Rena Nishitani, Tokyo (JP); Tomohiro Sasagawa, Tokyo (JP); Eiji Niikura, Tokyo (JP); Kuniko Kojima, Tokyo (JP); Jun Someya, Tokyo (JP); Hiroaki Sugiura, Tokyo (JP); Kazuhiko Tsutsumi, Tokyo (JP); Akihiro Nagase, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/641,052

(22) PCT Filed: Apr. 14, 2011

(86) PCT No.: PCT/JP2011/002209
§ 371 (c)(1),
(2), (4) Date: Oct. 12, 2012

(87) PCT Pub. No.: WO2011/129117
PCT Pub. Date: Oct. 20, 2011

(65) Prior Publication Data
US 2013/0033901 A1    Feb. 7, 2013

(30) Foreign Application Priority Data

Apr. 15, 2010 (JP) ................. 2010-093973
Apr. 23, 2010 (JP) ................. 2010-099827
Aug. 6, 2010 (JP) ................. 2010-177713

(51) Int. Cl.
*F21V 7/04* (2006.01)
(52) U.S. Cl.
USPC ........... 362/613; 362/611; 362/612; 362/607; 362/231; 362/617

(58) Field of Classification Search
USPC .......... 362/611, 612, 613, 231, 615, 617, 627
See application file for complete search history.

(56) References Cited

U.S. PATENT DOCUMENTS

| | | | |
|---|---|---|---|
| 6,827,458 B2* | 12/2004 | Suga | 362/609 |
| 7,481,562 B2* | 1/2009 | Chua et al. | 362/612 |

(Continued)

FOREIGN PATENT DOCUMENTS

| | | |
|---|---|---|
| JP | 6-138459 A | 5/1994 |
| JP | 11-185516 A | 7/1999 |
| JP | 2917866 B2 | 7/1999 |
| JP | 2002-15612 A | 1/2002 |
| JP | 2002-57376 A | 2/2002 |
| JP | 2005-64163 A | 3/2005 |
| JP | 2006-54088 A | 2/2006 |

(Continued)

*Primary Examiner* — Ali Alavi
(74) *Attorney, Agent, or Firm* — Birch, Stewart, Kolasch & Birch, LLP

(57) ABSTRACT

A planar light source device includes a first light source for emitting a first light ray having a punctate spatial luminance distribution; a second light source for emitting a second light ray; a first spatial luminance distribution conversion portion for changing the first light ray to a linear spatial luminance distribution; a second spatial luminance distribution conversion portion for changing a spatial luminance distribution of the first and second light rays to a planar spatial luminance distribution; wherein the first light ray is a laser light; the second light ray has a divergence angle larger than the divergence angle of the first light ray when the first light ray is emitted from the first light source; and a slow-axis direction of the first light ray entering the second spatial luminance distribution conversion portion is parallel to an outgoing direction of the planar light.

6 Claims, 20 Drawing Sheets

(56) References Cited

U.S. PATENT DOCUMENTS

| | | | |
|---|---|---|---|
| 8,368,838 B2* | 2/2013 | Kumasaka et al. | 349/61 |
| 2001/0030860 A1 | 10/2001 | Kimura et al. | |
| 2002/0070681 A1 | 6/2002 | Shimizu et al. | |
| 2003/0214725 A1* | 11/2003 | Akiyama | 359/640 |
| 2005/0007753 A1 | 1/2005 | Van Hees et al. | |
| 2006/0034579 A1 | 2/2006 | Sugiura | |
| 2006/0164229 A1* | 7/2006 | Masters et al. | 340/461 |
| 2007/0253216 A1 | 11/2007 | Watanabe | |
| 2009/0190070 A1 | 7/2009 | Nagata et al. | |
| 2010/0164919 A1 | 7/2010 | Yamamoto et al. | |
| 2010/0171690 A1 | 7/2010 | Park et al. | |

FOREIGN PATENT DOCUMENTS

| | | |
|---|---|---|
| JP | 2006-269289 A | 10/2006 |
| JP | 2007-299560 A | 11/2007 |
| JP | 4049267 B2 | 2/2008 |
| JP | 2008-60023 A | 3/2008 |
| JP | 2009-229746 A | 10/2009 |
| JP | 2009-300999 A | 12/2009 |
| JP | 2010-161056 A | 7/2010 |
| KR | 10-2008-0043905 A | 5/2008 |
| WO | 02/97324 A1 | 5/2002 |
| WO | 2007/091611 A1 | 8/2007 |
| WO | WO 2008/013146 A1 | 1/2008 |

* cited by examiner

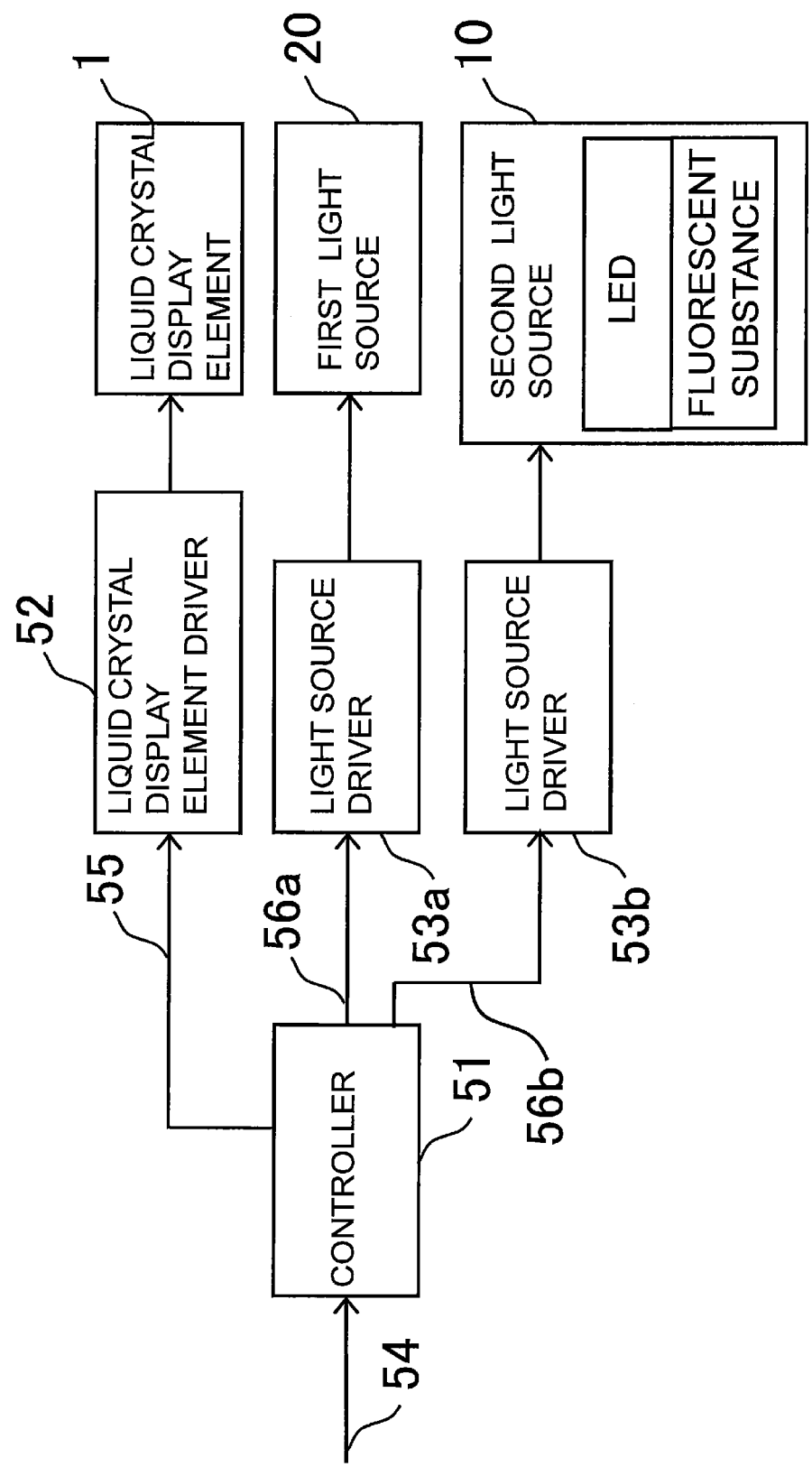

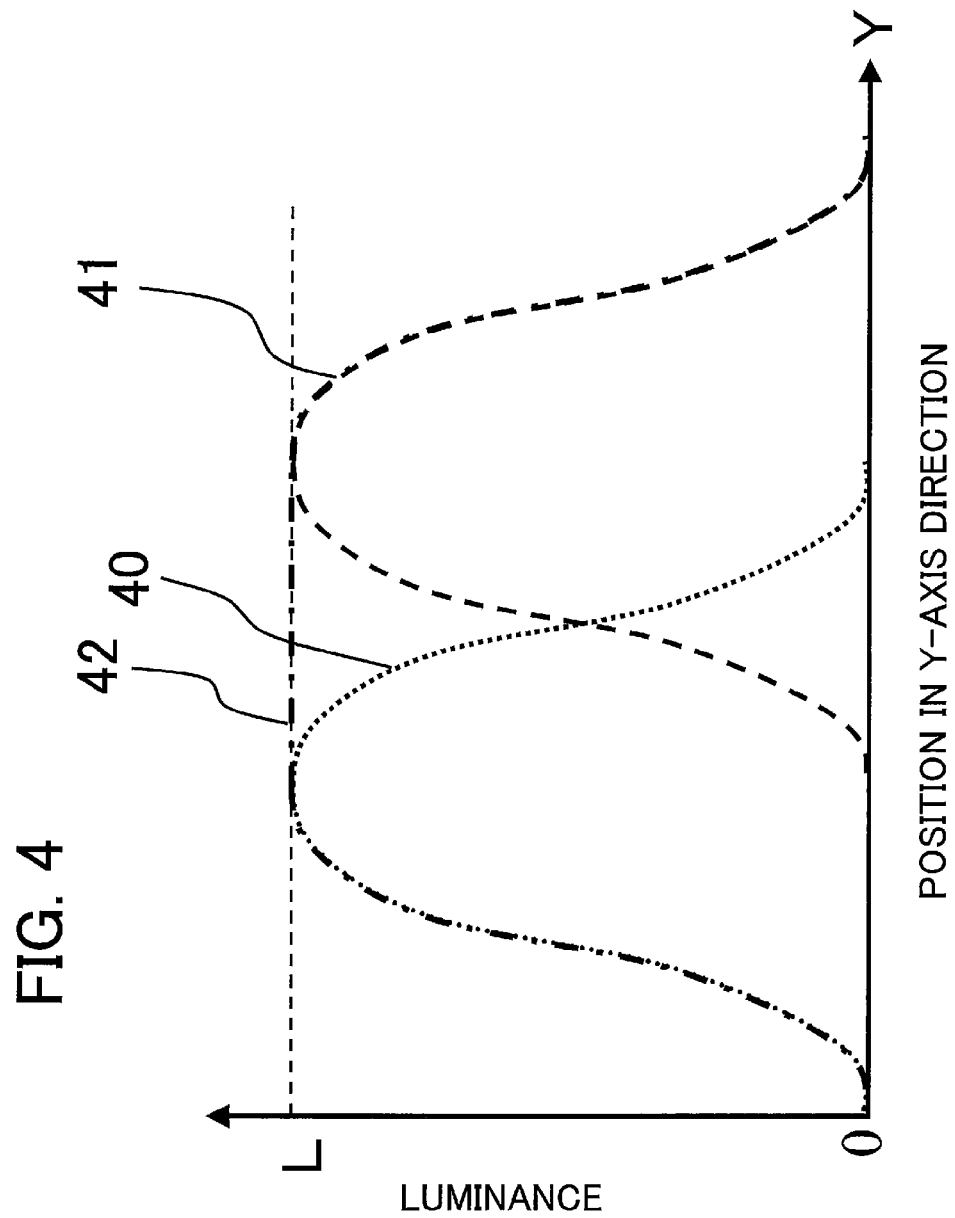

BACKLIGHT DEVICE AND LIQUID CRYSTAL DISPLAY APPARATUS

TECHNICAL FIELD

The present invention relates to a backlight device using a laser light source to illuminate a liquid crystal display element from a back surface side of the liquid crystal display element and a liquid crystal display apparatus including the backlight device.

BACKGROUND ART

Since a liquid crystal display element included in a liquid crystal display apparatus does not emit light for itself, a backlight device must be provided on the back surface side of the liquid crystal display element as a light source for illuminating the liquid crystal display element. In recent years, demand for thinner liquid crystal display apparatuses has been rising. Sidelight-type backlight devices which include a thin plate-like light guide plate and a light source disposed so as to face a side of the light guide plate and create a planar light source by entering light from a side face of the light guide plate are widely used.

The conventional mainstream of the light source of the backlight device was cold cathode fluorescent lamp (CCFL), which produces white light with a fluorescent substance applied on an inner wall of a glass tube. However, since performances of light emitting diodes (LEDs) have been tremendously improved in recent years, demand for backlight devices using LEDs as light sources is rapidly increasing.

Devices known as LEDs can be divided broadly into two types. A type of an LED is a monochromatic LED, which produces monochromatic light of red color, green color, blue color, or the like by direct emission of the LED. Another type of an LED is a multicolor LED, which includes a monochromatic LED and a fluorescent substance and produces light of a plurality of colors by exciting the fluorescent substance by the light emitted from the monochromatic LED. Some multicolor LEDs include a monochromatic blue LED and a fluorescent substance which absorbs blue light and produces light of green color to red color. The multicolor LED can configure a white LED which generates white light having a wide spectrum ranging from the blue color to the red color. Since the white LED has high emission efficiency and is effective for reducing power consumption, it has been widely used as a light source of the backlight device.

A Liquid crystal display element in the liquid crystal display apparatus includes color filters. The liquid crystal display apparatus displays colors using wavelengths of red color, green color and blue color filtered by the color filters. If the light source has a broad wavelength bandwidth of a continuous spectrum, like the white LED, in order to expand the color reproduction range, the liquid crystal display apparatus must improve chromatic purity of display colors by narrowing the wavelength band of light passing through the color filters. Narrowing the wavelength of light that passes through the color filters increases the amount of unwanted light. In other words, usage efficiency of light by the liquid crystal display element deteriorates greatly. Accordingly, the luminance of the display surface of the liquid crystal display element lowers. Furthermore, if it is tried to improve the luminance, the power consumption of the liquid crystal display apparatus increases.

The CCFL and white LED in general use have a peak at about 615 nm (a wavelength obtained by shifting a wavelength from red color toward orange color) in the red wavelength range because of the characteristics of the fluorescent substance. If it is tried to improve the chromatic purity in the wavelength region of 630 to 640 nm, which is preferable as pure red in the red color, the amount of transmitted light decreases extremely, thereby lowering the luminance significantly. The CCFL and white LED have a small amount of energy especially in the spectrum of the red color of 600 nm to 700 nm. If it is tried to improve the chromatic purity in the wavelength region of 630 to 640 nm, which is preferable as pure red in the red color, the amount of transmitted light decreases extremely, thereby lowering the luminance significantly.

In order to expand the color reproduction range while minimizing loss of light by the color filters, a light source that emits a light ray of a narrow wavelength bandwidth must be used. That is, in order to expand the color reproduction range, a light source that emits a light ray with a high chromatic purity must be used. In recent years, a liquid crystal display apparatus using monochromatic LEDs that emit light rays of the three primary colors, red, green, and blue, respectively is proposed. A liquid crystal display apparatus using monochromatic lasers that emit light rays of the three primary colors respectively is also proposed. In these liquid crystal display apparatuses, the three primary colors of light are mixed to generate white light.

In recent years, a liquid crystal display apparatus including a backlight unit using monochromatic LEDs or lasers with a narrow spectral width as the light source are proposed to expand the color reproduction range. The narrow spectral width means that the chromatic purity is high. Particularly, a laser has a very high monochromaticity. A laser also has high light emission efficiency. Accordingly, use of LEDs and lasers makes it possible to provide bright images with a wide color reproduction range. Use of LEDs and lasers also makes it possible to provide a low-power-consumption liquid crystal display apparatus. Particularly, because of their high monochromaticity, lasers can expand the color reproduction range greatly and can improve the picture quality of the liquid crystal display apparatus significantly.

When the light rays emitted from these light sources are mixed to generate white light, however, a difference in spatial luminance distribution on the display surface of the liquid crystal display element of the different colors appear as color unevenness. To reduce the color unevenness, the spatial luminance distributions in the surfaces of different colors must be improved in uniformity. However, light emitted from light sources using different light emission principles or light emitting elements of different properties differ in divergence angle or light emission efficiency, and the number of light sources to be disposed and the ways of disposing the light sources vary. For these reasons, an optimum means for uniforming the spatial luminance distribution in the surface must be provided for each light source.

If point light sources such as LEDs and lasers are used as light sources of a sidelight-type backlight device, luminance in the vicinity of the light source is considerably high. This results in unevenness in luminance around the incident end of light. That kind of unevenness in luminance can be reduced, for example, by arranging a great number of point light sources at short intervals in a row analogously to a linear light source. Since the backlight device of the liquid crystal display apparatus requires high uniformity in spatial luminance distribution in a surface, a quite number of light sources would be necessary. This would increase the power consumption, lower the manufacturability, and increase the cost.

If the light rays of different colors have different unevenness in luminance, color unevenness occurs. Unevenness in luminance and unevenness in color in the liquid crystal display apparatus will decrease picture quality remarkably. Therefore, the backlight device is required to provide planar light of each color with a uniform spatial luminance distribution in the surface. The spatial luminance distribution in the surface is a distribution indicating the degree of luminance in positions expressed two-dimensionally in a given plane.

A technology for uniforming the spatial luminance distribution in the surface with a minimum number of light sources when LEDs and other point light sources are used has been reported. For example, in the technique disclosed in patent document 1, the light emitting elements in the liquid crystal display apparatus are covered with hemispherical transparent materials including a plurality of materials having different refractive indices. The light rays emitted from the light emitting elements are diffused by refraction, and the distribution of light in the light input portion of the light guide plate can be made closer to light having a linear shape in the cross section perpendicular to the light traveling direction (a light ray similar to a light ray emitted from a linear light source). The linear light source is a light source that emits a light ray having an almost uniform spatial luminance distribution in one-dimensional direction. The light rays from a plurality of point light sources can be overlapped to generate a light ray having a linear shape in the cross section perpendicular to the light traveling direction (a light ray similar to a light ray emitted from a linear light source).

For example, a planar light source unit in patent document 2 has a light diffusing face in the back surface of a light guide plate, and the light diffusing face is provided to convert a light ray from a point light source to a light ray having a linear shape in the cross section perpendicular to the light traveling direction (a light ray similar to a light ray emitted from a linear light source). In addition, the planar light source unit has a light diffusing face for uniforming the spatial luminance distribution in the surface of the backlight device. In the diffusing face for converting a light ray from a point light source to a light ray having a linear shape in the cross section perpendicular to the light traveling direction (a light ray similar to a light ray emitted from a linear light source), the rate of covering the diffusion material is lowered in a part where the point light source has a high luminance. In a part where the point light source has a low luminance, the rate of covering the diffusion material is increased. With this configuration, a light ray from a point light source can be converted to a light ray having a linear shape in the cross section perpendicular to the light traveling direction (a light ray similar to a light ray emitted from a linear light source).

Backlight units including a special light guide plate for each light source having different properties for the purpose of suppressing color unevenness is also reported. For example, a backlight unit for flat display panel including a special light guide plate for the light source of each color is proposed in patent document 3. This backlight unit for flat display panel includes different light sources of different colors and light guide plates corresponding to the light source, and they are layered. In this backlight unit, monochromatic planar light rays exiting the light guide plates are added up to generate a white illuminating light ray. With this configuration, the structure of each light guide plate can be optimized for the properties of the single light source corresponding to the light guide plate. Accordingly, this configuration allows the uniformity of the planar spatial luminance distribution of each color to be improved, consequently color unevenness to be suppressed. The planar spatial luminance distribution is a distribution indicating the degree of luminance with respect to a position expressed in two dimensionally in a given plane.

The technology according to patent document 1 and patent document 2 adds an optical element for converting a light ray from a point light source to a light ray having a linear shape in the cross section perpendicular to the light traveling direction (a light ray similar to a light ray emitted from a linear light source). Accordingly, a light ray having an approximately uniform spatial luminance distribution in a one-dimensional direction can be sent into the light guide plate from its face. Then, a linear light source having uniform planar spatial luminance distribution can be obtained. These optical elements, however, require complicated structures. If a point light source with a high directionality, like a laser, is used as a light source, a complicated optical element with higher diffuseness would be required. That type of optical element would require a longer optical distance to convert alight ray from the point light source to a light ray having a linear shape in the cross section perpendicular to the light traveling direction (a light ray similar to a light ray emitted from a linear light source), so the apparatus would become large. Therefore, these types of optical elements are not suitable when a laser light source is used.

A backlight unit based on a technology disclosed in patent document 3 includes a light guide plate for each of a plurality of light sources having different properties. Accordingly, a planar light source having suppressed color unevenness and uniform planar spatial luminance distribution can be obtained. In that configuration, a plurality of light guide plates must be layered, and the backlight unit would become large especially in the direction of thickness of the unit.

PRIOR ART DOCUMENT

Patent Document

Patent document 1: Japanese Patent Application Publication No. 2006-269289
Patent document 2: Japanese Patent No. 2917866
Patent document 3: Japanese Patent Application Publication No. H6-138459

SUMMARY OF THE INVENTION

Problems to be Solved by the Invention

When a white LED is used as a light source of a liquid crystal display apparatus, as in patent document 1 or 2, the color range of the red color would become narrow. Further, when a monochromatic red LED is used as a light source of a liquid crystal display apparatus, the color range of the red color would become narrow. Furthermore, when a CCFL is used as a light source of a liquid crystal display apparatus, as in patent document 3, the color range of the red color would become narrow.

That is because the CCFL and white LED widely used in existing backlight devices has a peak in the red wavelength band at a wavelength of around 615 nm, closer to the orange color. In other words, the amount of energy of light in the red color range is small. Particularly, the proportion of light of 630 to 640 nm preferable as red color in the red color range is very small.

If it is tried to increase chromatic purity in the wavelength region of 630 to 640 nm, particularly preferable as the red color, the amount of transmitted light decreases greatly, thereby lowering the luminance significantly. Since a monochromatic red LED has a wide wavelength bandwidth of several tens of nanometers, use of a filter having a narrow wavelength bandwidth would lower the luminance.

If the light sources of three primary colors are lasers, the chromatic purity can be improved, but the power consumption becomes a problem, in comparison with a multicolor LED using fluorescent substance.

In view of the problems described above, it is an object of the present invention to provide a backlight device and a liquid crystal display apparatus that can reduce deterioration of usage efficiency of light and can expand the color reproduction range.

Means of Solving the Problems

To solve the problems described above and to achieve the object, a backlight device according to the present invention includes a first light source for emitting a first light ray, which is a red laser light and a second light source for emitting a second light ray, which is a cyan light ray, in a complementary relationship with the laser light, and the second light source includes a light emitting diode which emits a blue light ray and a fluorescent substance which absorbs the blue light ray and emits a green light ray.

Effect of the Invention

The backlight device and liquid crystal display apparatus according to the present invention can suppress power consumption and can provide high-quality images with an expanded color reproduction range.

BRIEF DESCRIPTION OF THE DRAWINGS

FIG. 2 is a schematic block diagram showing a configuration of the liquid crystal display apparatus of the first embodiment;

FIG. 4 is a diagram schematically showing a one-dimensional spatial luminance distribution in a Y-axis direction, of a light ray having a linear shape in a cross section perpendicular to a light traveling direction (a light ray similar to a light ray emitted from a linear light source), formed by a plurality of laser light rays traveling in a light guide plate;

MODE FOR CARRYING OUT THE INVENTION

Liquid crystal display apparatuses and backlight devices according to embodiments of the present invention will be described below in detail with reference to the drawings. The liquid crystal display apparatuses and backlight devices according to the present invention will not be confined to the embodiments given below.

First Embodiment

Figure 1:
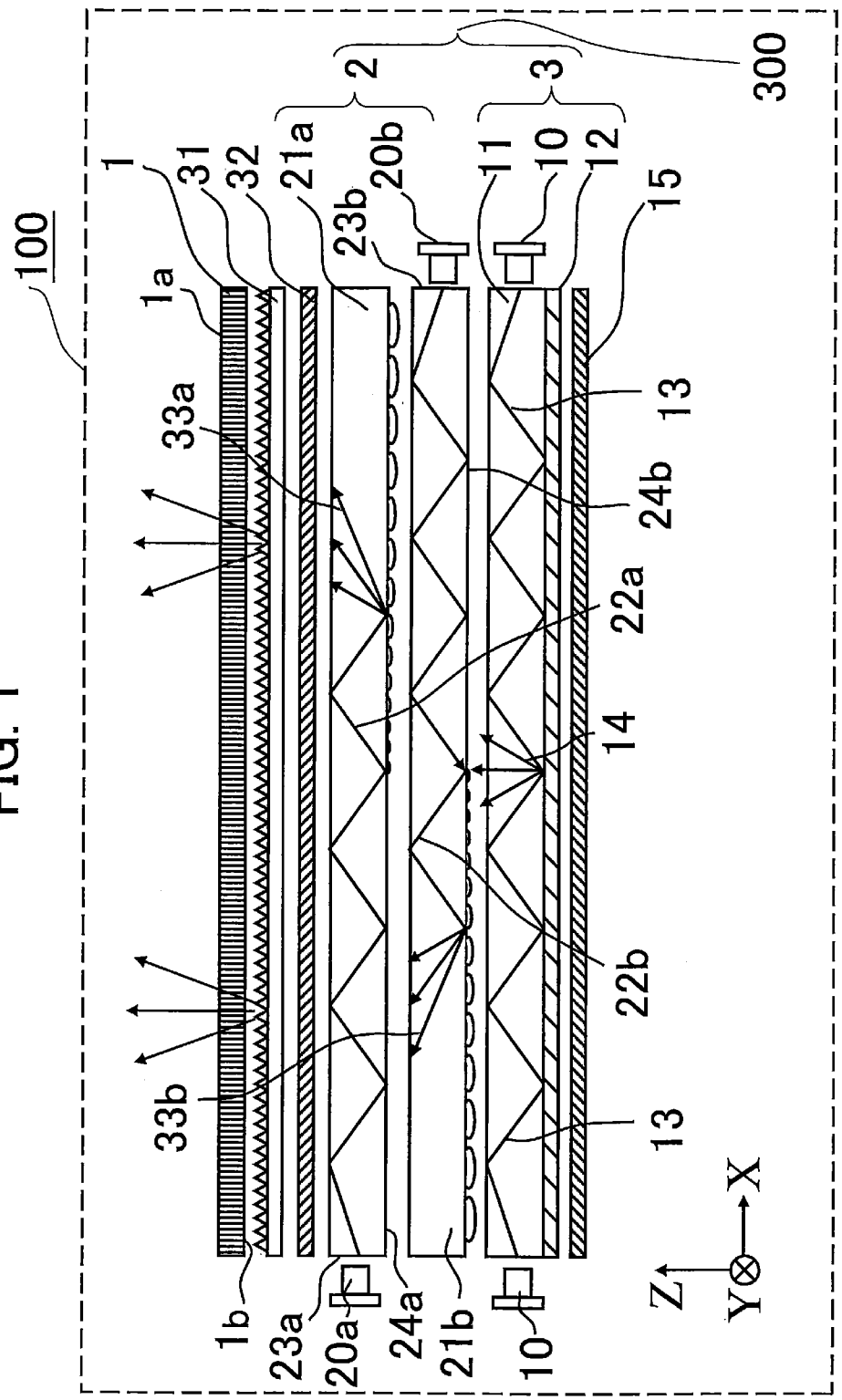
FIG. 1 is a diagram schematically showing structure of a liquid crystal display apparatus of a first embodiment.

FIG. 1 is a diagram schematically showing structure of a liquid crystal display apparatus 100, which is a transmission-type display apparatus according to a first embodiment of the present invention. A backlight device in the first embodiment includes a first backlight unit 2 and a second backlight unit 3. For ease of understanding, let a short side direction of a liquid crystal display element 1 be a Y-axis direction, a long side direction of the liquid crystal display element 1 (direction orthogonal to a Y-axis) be an X-axis direction, and a direction perpendicular to an X-Y plane be a Z-axis direction. In addition, let a side of a display surface 1a of the liquid crystal display element 1 be a positive Z-axis direction, an upper direction of the liquid crystal display apparatus (an upper direction when the liquid crystal display apparatus 100 is placed so that its screen faces in a horizontal direction) be a positive Y-axis direction, and a light output direction of a first light source 20a, which will be described later, be a positive X-axis direction.

As shown in FIG. 1, the liquid crystal display apparatus 100 includes the transmission-type liquid crystal display element 1, a first optical sheet 31, a second optical sheet 32, the first backlight unit 2, the second backlight unit 3, and a light reflection sheet 15. The components 1, 31, 32, 2, 3 and 15 are laid on top of one another in the Z-axis direction. The liquid crystal display element 1 has the display surface 1a parallel to the X-Y plane.

The liquid crystal display apparatus 100 includes a liquid crystal display element driver 52 shown in FIG. 2, as a driver for driving the liquid crystal display element 1 in accordance with an input video signal. Further, the liquid crystal display apparatus 100 includes light sources 20a and 20b as a first light source 20 included in the first backlight unit 2, and a light source driver 53a for driving the light sources 20a and 20b. In the first embodiment, a combination of the light source 20a and the light source 20b will be referred to as the first light source 20. The liquid crystal display apparatus 100 further includes a light source 10 as a second light source included in the second backlight unit 3, and a light source driver 53b for driving the light source 10. The operation of the liquid crystal display element driver 52 and the light source drivers 53a and 53b is controlled by a controller 51.

The controller 51 generates control signals (such as a liquid crystal display element control signal 55 and light source control signals 56a and 56b) by performing image processing on a video signal 54 supplied from a signal source, which is not illustrated, and supplies these control signals to the liquid crystal display element driver 52 and the light source drivers 53a and 53b. The light source drivers 53a and 53b drive the light sources 20a, 20b and 10 in accordance with the light source control signals 56a and 56b from the controller 51 respectively and have the light sources 20a, 20b and 10 emit light rays. The controller 51 can adjust a proportion of luminance of light rays 22a and 22b, which are first light rays emitted from the light sources 20a and 20b and luminance of a light ray 13, which is a second light ray emitted from the light source 10, by controlling the light source driver 53a.

The first backlight unit 2 changes the red light rays 22a and 22b emitted from the light sources 20a and 20b to illuminating light rays 33a and 33b traveling in the positive Z-axis direction and then exit them toward a back surface 1b of the liquid crystal display element 1. These illuminating light rays 33a and 33b pass through the second optical sheet 32 and the first optical sheet 31 and are applied to the back surface 1b of the liquid crystal display element 1. The second backlight unit 3 changes the light ray 13 coming from the light source 10 (the light ray has a cyan tint having peak intensities in blue and green) to an illuminating light ray 14 traveling toward the back surface 1b of the liquid crystal display element 1 and then exits the illuminating light ray 14. The illuminating light ray 14 passes through the first backlight unit 2, the second optical sheet 32 and the first optical sheet 31 and reaches the back surface 1b of the liquid crystal display element 1. The first optical sheet 31 is a sheet with an effect of collecting light rays exited from the backlight unit in a normal direction with respect to the screen of the liquid crystal display apparatus 100. The second optical sheet 32 is a sheet with a function of suppressing optical effects such as slight unevenness in illumination.

The light reflection sheet 15 is disposed directly under the second backlight unit 3 (in the negative Z-axis direction in FIG. 1 and on a back surface side of the liquid crystal display apparatus 100). Light exited from the first backlight unit 2 and the second backlight unit 3 toward the back surface (in the negative Z-axis direction) reflects off the light reflection sheet 15 and is used as an illuminating light ray on the back surface 1b of the liquid crystal display element 1. As the light reflection sheet 15, a light reflection sheet based on plastic such as polyethylene terephthalate and a light reflection sheet made by depositing metal on a surface of a substrate can be used.

The liquid crystal display element 1 has a liquid crystal layer parallel to the X-Y plane. The display surface 1a of the liquid crystal display element 1 has a rectangular shape. The X-axis direction and Y-axis direction shown in FIG. 1 are directions along two orthogonal sides of the display surface 1a. The liquid crystal display element driver 52 changes optical transmittance of the liquid crystal layer in units of pixels in accordance with the liquid crystal display element control signal 55 supplied from the controller 51. Each pixel has three sub-pixels, and each sub-pixel has a color filter that passes red light, green light, or blue light only. The liquid crystal display element driver 52 displays a color image on the display surface by controlling transmittance of each sub-pixel. Accordingly, the liquid crystal display element 1 generates image light by modulating illuminating light rays entering from the first backlight unit 2 and the second backlight unit 3 spatially. The liquid crystal display element 1 outputs the image light from the display surface 1a. The image light is light ray having image information. In the first embodiment, the controller 51 can control the light source drivers 53a and 53b separately to adjust the proportion of the luminance of the red illuminating light rays 33a and 33b exited from the first backlight unit 2 and the luminance of cyan illuminating light ray 14 exited from the second backlight unit 3. By adjusting the amount of luminescence of light source in accordance with the proportion of luminance of colors needed for the video signal 54, power consumption can be lowered.

Figure 3A:
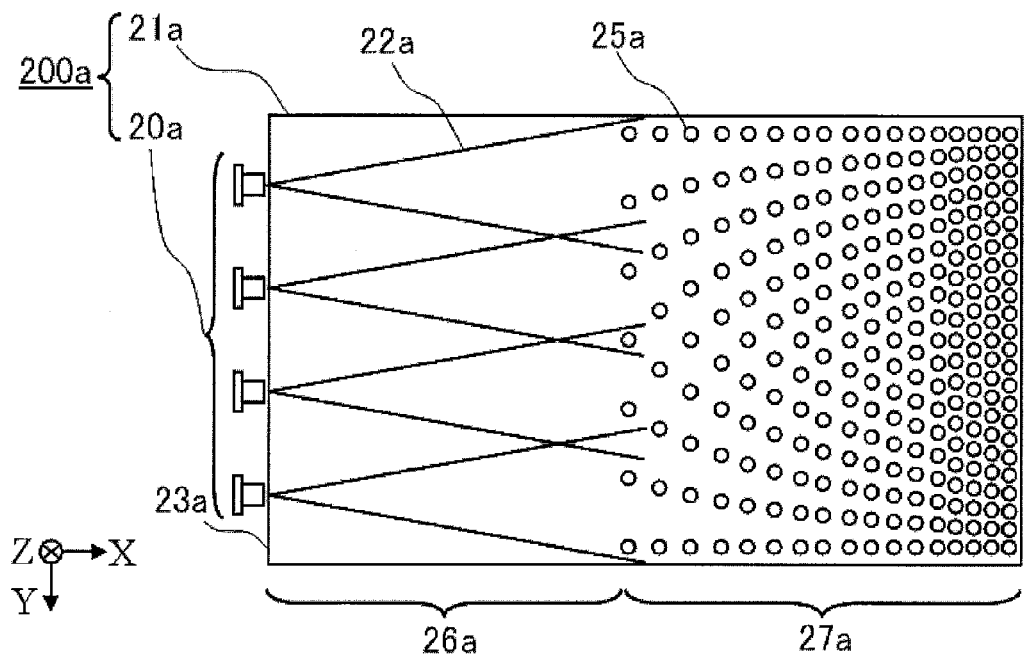
FIGS. 3A and 3B are diagrams schematically showing an example of structures of planar laser light sources included in a first backlight unit of the first embodiment.
Figure 3B:
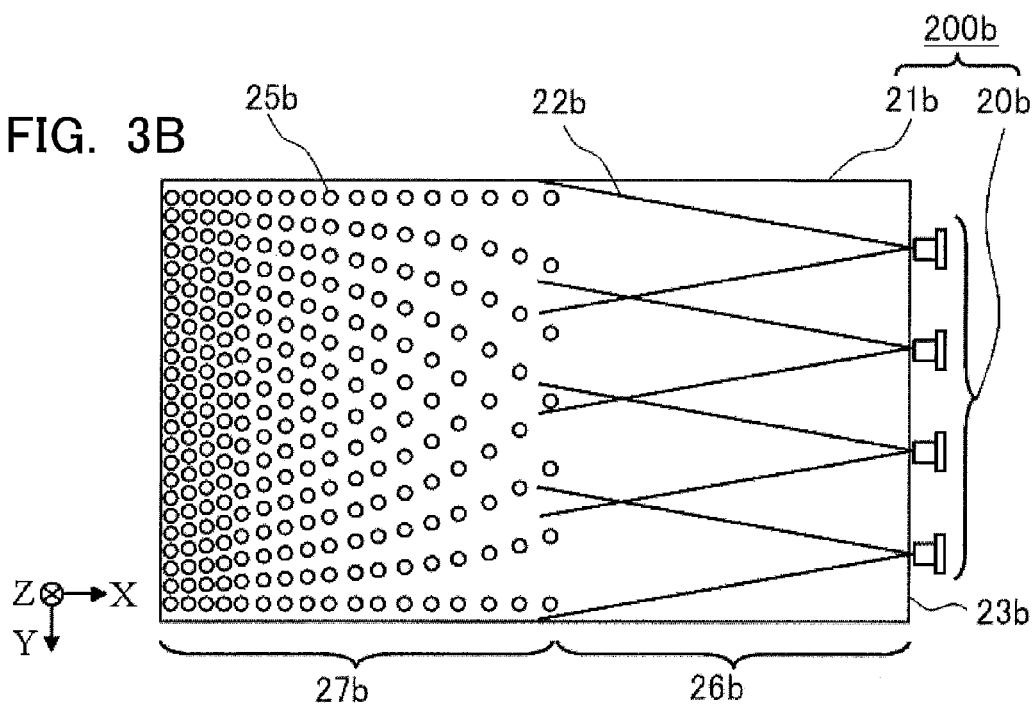

The first backlight unit 2 includes a first planar laser light source unit 200a and a second planar laser light source unit 200b. The first planar laser light source unit 200a includes the light source 20a and a light guide plate 21a disposed parallel to the display surface 1a of the liquid crystal display element 1. The second planar laser light source unit 200b includes a light source 20b and a light guide plate 21b disposed parallel to the display surface 1a of the liquid crystal display element 1. FIG. 3A shows a schematic view of the first planar laser light source unit 200a viewed in the positive Z-axis direction (viewed from a lower side in FIG. 1). FIG. 3B shows a schematic view of the second planar laser light source unit 200b viewed in the positive Z-axis direction (viewed from the lower side in FIG. 1).

The light source 20a included in the first planar laser light source unit 200a faces an end face 23a which is a light incidence end face in a negative X-axis direction of the light guide plate 21a which is a first light guide plate. For example, the light source 20a includes a plurality of laser light emitting elements arranged at regular intervals in the Y-axis direction. The light guide plate 21a included in the first planar laser light source unit 200a is formed by a transparent material. The light guide plate 21a is a plate-like member. The light guide plate 21a has microscopic optical elements 25a, which function as an optical element unit, in its back surface 24a on the opposite side of the liquid crystal display element 1. The light ray (outgoing light ray) 22a emitted from the light source 20a enters the light guide plate 21a from the end face 23a of the light guide plate 21a and travels in the light guide plate 21a by total reflection. In the second planar laser light source unit 200b, the light source 20b faces an end face 23b which is a light incidence end face in the X-axis direction of the light guide plate 21b which is the first light guide plate. For example, the light source 20b includes a plurality of laser light emitting elements arranged at regular intervals in the Y-axis direction. The light guide plate 21b included in the second planar laser light source unit 200b is formed by a transparent material. The light guide plate 21b is a plate-like member. The light guide plate 21b has microscopic optical elements 25b in its back surface 24b. The light ray (outgoing light ray) 22b emitted from the light source 20b enters the light guide plate 21b from the end face 23b of the light guide plate 21b and travels in the light guide plate 21b by total reflection.

It is preferable that laser light emitting elements having identical characteristics be used as the light source 20a included in the first planar laser light source unit 200a and the light source 20b included in the second planar laser light source unit 200b. It is also preferable that the laser elements be disposed at the same intervals, in the same positions and at the same angles with reference to the end faces 23a and 23b of the light guide plates 21a and 21b. It is further preferable that the light guide plate 21a included in the first planar laser light source unit 200a and the light guide plate 21b included in the second planar laser light source unit 200b have an identical structure. In other words, it is preferable that the first planar laser light source unit 200a and the second planar laser light source unit 200b have identical characteristics.

The first backlight unit 2 includes the first planar laser light source unit 200a and the second planar laser light source unit 200b that have identical characteristics. The first planar laser light source unit 200a and the second planar laser light source unit 200b have such positional relationships that they are rotated by 180 degrees around the normal line (line in the Z-axis direction in FIG. 1) to the display surface 1a of the liquid crystal display element 1. The light guide plate 21a and the light guide plate 21b are layered so that four side faces of the light guide plate 21a and four side faces of the light guide plate 21b are aligned in the same planes. In other words, the light source 20a included in the first planar laser light source unit 200a and the light source 20b included in the second planar laser light source unit 200b are disposed so as to face each other. The light source 20a emits a light ray in the positive X-axis direction. The light source 20b emits a light ray in the negative X-axis direction. Therefore, the light rays (light rays 22a and 22b) emitted from the light sources 20a and 20b travel in the opposite directions. However, both the illuminating light ray 33a exited from the first planar laser light source unit 200a and the illuminating light ray 33b exited from the second planar laser light source unit 200b are exited toward the back surface 1b of the liquid crystal display element 1.

In the first backlight unit 2 in the first embodiment, the two planar laser light source units 200a and 200b are layered in the direction (positive Z-axis direction) in which the illuminating light rays are emitted, as described above. The illuminating light rays 33a and 33b are illuminating light rays exited from the first backlight unit 2 when the light sources 20a and 20b included in the first backlight unit 2 are lit up. The illuminating light rays 33a and 33b exited from the two planar laser light source units 200a and 200b are added together. Therefore, the spatial luminance distribution in the X-Y plane of the illuminating light ray exited from the first backlight unit 2 becomes the sum of the spatial luminance distributions of the two planar laser light source units 200a and 200b in the X-Y plane.

The light guide plates 21a and 21b are formed by a transparent material such as an acrylic plastic (PMMA). Each of the light guide plates 21a and 21b is a plate-like member with a thickness of 2 mm, for example. The light rays (laser light rays) 22a and 22b entering the light guide plates 21a and 21b from their end faces 23a and 23b travel in the X-axis direction by repeating reflection inside the light guide plates 21a and 21b, by total reflection at the interface between air and the light guide plates 21a and 21b. As shown in FIGS. 1 and 3, the light guide plates 21a and 21b include optical transmission portions 26a and 26b for transmitting the light rays 22a and 22b emitted from the light sources 20a and 20b just inside the light guide plates 21a and 21b. The optical transmission portions 26a and 26b are a first spatial luminance distribution conversion portion having the function of converting a punctate spatial luminance distribution to a linear spatial luminance distribution. The light guide plates 21a and 21b include also optical element portions 27a and 27b for changing the traveling directions of the light rays 22a and 22b traveling in the X-axis direction through the optical transmission portions 26a and 26b to the Z-axis direction.

The optical transmission portions 26a and 26b included in the light guide plates 21a and 21b are disposed in the vicinity of the end faces 23a and 23b. The light rays 22a and 22b emitted from the light sources 20a and 20b enter the light guide plates 21a and 21b from the end faces 23a and 23b. Then, the light rays 22a and 22b travel in the optical transmission portions 26a and 26b in the X-axis direction. In the optical transmission portions 26a and 26b, the front surfaces (faces on the side of the liquid crystal display element 1) and the back surfaces 24a and 24b (faces on the opposite side of the liquid crystal display element 1) of the light guide plates 21a and 21b where the light rays 22a and 22b enter do not have special structures such as projections and are plane surfaces. Therefore, the light rays 22a and 22b traveling in the optical transmission portions 26a and 26b travel, while keeping their divergence angles and traveling directions. The light rays 22a and 22b emitted from the light sources 20a and 20b spread spatially because of their divergence angles by traveling in the optical transmission portions 26a and 26b.

The light guide plates 21a and 21b have optical element portions 27a and 27b in positions differing from the optical transmission portions 26a and 26b. The optical element portions 27a and 27b have the function of converting a light ray having a linear spatial luminance distribution to a light ray having a planar spatial luminance distribution. The optical element portions 27a and 27b also has the function of emitting the light ray having the linear spatial luminance distribution toward the liquid crystal display element 1. The optical element portions 27a and 27b are a second spatial luminance distribution conversion portion. The optical element portions 27a and 27b include the microscopic optical elements 25a and 25b in their back surfaces 24a and 24b (faces on the opposite side of the liquid crystal display element 1) respectively. The microscopic optical elements 25a and 25b convert the light rays 22a and 22b traveling in the light guide plates 21a and 21b to light rays (the illuminating light rays 33a and 33b) exited toward the back surface 1b of the liquid crystal display element 1 (in the positive Z-axis direction). Each of the microscopic optical elements 25a and 25b has a convex hemispherical shape (such as a shape of a convex lens). When the light rays 22a and 22b traveling in the X-axis direction from the optical transmission portions 26a and 26b enter the microscopic optical elements 25a and 25b in the optical element portions 27a and 27b, they are refracted by their curved faces. Then, some of the light rays 22a and 22b traveling in the light guide plates 21a and 21b fail to satisfy the conditions of total reflection at the interface between air and the front surfaces (faces on the side of the liquid crystal display element 1) of the light guide plates 21a and 21b. The light rays that fail to satisfy the conditions of total reflection are exited from the front surface of the light guide plate 21a and travel toward the back surface 1b of the liquid crystal display element 1 and are exited from the front surface of the light guide plate 21b and travel through the light guide plate 21a toward the back surface 1b of the liquid crystal display element 1.

The microscopic optical elements 25a and 25b disposed in the optical element portions 27a and 27b of the light guide plates 21a and 21b vary their disposition densities with respect to their positions in the X-Y plane on the light guide plates 21a and 21b. This allows the spatial luminance distributions in the plane of the illuminating light rays 33a and 33b exited from the light guide plates 21a and 21b toward the liquid crystal display element 1. The disposition density is a proportion of the area occupied by the microscopic optical elements 25a and 25b per unit area. As shown in FIGS. 3A and 3B, the disposition density can be adjusted by changing the number of the microscopic optical elements 25a and 25b per unit area. The disposition density can also be adjusted by changing the size of the microscopic optical elements 25a and 25b (area of a single microscopic optical element) per unit area, as shown in FIG. 1. In the first embodiment, the disposition densities of the microscopic optical elements 25a and 25b vary with respect to the position in the traveling direction (positive and negative X-axis directions in FIG. 3) of the laser light rays 22a and 22b, as shown in FIG. 3. More specifically, the light guide plates 21a and 21b do not have the microscopic optical elements 25a and 25b in the vicinity of the end faces 23a and 23b. The microscopic optical elements 25a and 25b are provided in ranges from the vicinity of the central positions in the X-axis direction of the light guide plates 21a and 21b from the positions of the end faces on the opposite side of the end faces 23a and 23b. The disposition densities vary in phases or continuously from low to high from the vicinity of the central positions toward the end faces of the light guide plates 21a and 21b.

As the microscopic optical elements 25a and 25b, a microscopic optical element shaped like a convex lens, with a surface curvature of approximately 0.15 mm, the maximum height of approximately 0.005 mm, and a refractive index of approximately 1.49 can be adopted, for example. The material of the light guide plates 21a and 21b and the microscopic optical elements 25a and 25b can be an acrylic plastic. However, the material of the microscopic optical elements 25a and 25b is not limited to an acrylic plastic. The material of the microscopic optical elements 25a and 25b may be another plastic material such as a polycarbonate plastic or a glass material if it has a high optical transmittance and a high forming ability.

In the first embodiment, each of the microscopic optical elements 25a and 25b is shaped like a convex lens, but the microscopic optical elements 25a and 25b are not confined to that shape. The microscopic optical elements 25a and 25b may have any other shape if it has such structure that a laser light ray traveling in the light guide plate in the X-axis direction is refracted and directed toward the back surface 1b of the liquid crystal display element 1. Each of the microscopic optical elements 25a and 25b may have a prism shape or a shape having a random uneven pattern, for example.

In the first embodiment, the light guide plate has a thickness of 2 mm, but the thickness of the light guide plate is not confined to this thickness. In terms of making liquid crystal display apparatuses thinner and lighter and improving usage efficiency of light by increasing frequency of multiple reflections, use of thin light guide plates is preferable. Since the laser light source has a light emitting face with a small area and also has a high directionality, high optical coupling efficiency can be obtained with a thin light guide plate. The lowered rigidity caused by using the thin light guide plate and other problems should be considered here.

As the light sources 20a and 20b, use of a light source that emits a laser light ray having a highly monochromatic spectrum with a peak wavelength at 640 nm and a full-width-at-half-maximum spectral width of 1 nm is preferable. The full-width-at-half-maximum divergence angle is 40 degrees in a fast-axis direction and is 10 degrees in a slow-axis direction. In the first embodiment, the laser light emitting elements are disposed so that the fast-axis direction becomes parallel to a short side direction of a side end face of the light guide plate. This disposition brings the fast-axis direction in which the divergence angle is large parallel to the short side direction in the side end face of the light guide plate, or a direction in which a distance between confronting faces of the light guide plates becomes the narrowest (Z-axis direction in FIG. 1). This increases the number of reflections of the laser light ray inside the light guide plate, thereby increasing light entering the microscopic optical elements 25a and 25b in the light guide plates 21a and 21b. Accordingly, a light ray extraction efficiency E by the microscopic optical elements 25a and 25b can be improved. The light ray extraction efficiency E is defined as given below.

$$E = \text{(amount of light emitted toward liquid crystal display element)/(amount of light traveling in light guide plate)}$$

According to the first embodiment, diameters of the laser light rays emitted from the light sources 20a and 20b are like a very small spots with respect to extents of the end faces 23a and 23b in the Y-axis direction, and the light sources 20a and 20b can be considered as point light sources. The light rays (laser light rays) 22a and 22b, however, can travel sufficient optical distances in the optical transmission portions 26a and 26b disposed in the vicinity of the light incidence end faces of the light guide plates 21a and 21b by total reflection. Since the light rays 22a and 22b spread because of their divergence angles, the light rays 22a and 22b from adjacent laser light emitting elements overlap each other, producing a light ray having an even spatial luminance distribution in the Y-axis direction, or a light ray having a linear shape in a cross section perpendicular to the traveling direction (a light ray which is similar to a light ray emitted from a linear light source). The light rays 22a and 22b now has a linear shape in the cross section perpendicular to the traveling direction (a light ray which is similar to a light ray emitted from the linear light source).

FIG. 4 is a view illustrating that laser light rays emitted from two adjacent laser light sources form a light ray having a linear shape in a cross section perpendicular to a light traveling direction (a light ray similar to a light ray emitted from a linear light source) after it travels a given optical length. As shown in FIG. 4, a spatial luminance distribution 40 is a luminance distribution corresponding to a position in the Y-axis direction of a laser light ray emitted from a single laser light source in a given position in the X-axis direction. The luminance distribution shows an angular luminance distribution having an approximately Gaussian profile intrinsic to the laser light ray. The angular luminance distribution has such a profile in that a central luminance is high and decreases sharply as a distance from a center increases. Therefore, if a single laser light ray enters a microscopic optical structure (microscopic optical elements 25a and 25b), the angular luminance distribution of the laser light ray would be reflected in the spatial luminance distribution in a plane of an illuminating light ray emitted from a light guide plate, producing uneven luminance. However, if a plurality of laser light rays emitted from the laser light sources disposed closely in the Y-axis direction are overlapped spatially, the distributions are uniformed. For example, if a single laser light ray having the spatial luminance distribution 40 and a single laser light ray having a spatial luminance distribution 41 shown in FIG. 4 are overlapped, a resultant spatial luminance distribution has a uniform distribution, producing an even spatial luminance distribution like a spatial luminance distribution 42. As described here, by arranging laser light emitting elements to produce an even spatial luminance distribution in a direction in which the light sources are arranged (Y-axis direction), a light ray having a linear shape in a cross section perpendicular to its traveling direction can be produced. Therefore, by overlapping a plurality of light rays each having an uneven distribution, a resultant spatial luminance distribution can be an even luminance distribution. Accordingly, a light ray having an even spatial luminance distribution in a direction of arrangement of the light sources, or a light ray having a linear shape in a direction perpendicular to its traveling direction, can be created.

In order to overlap the light rays of neighboring laser light emitting elements, the laser light rays should travel at least an optical distance determined by the divergence angles of the laser light rays and the disposition distance between the laser light sources. The light guide plates 21a and 21b included in the planar laser light source units 200a and 200b in the first embodiment, however, have the optical transmission portions 26a and 26b before the laser light rays enter the microscopic optical elements 25a and 25b. The optical transmission portions 26a and 26b have an optical traveling distance that is required for the laser light ray to spread because of its own divergence angle, spatially in the direction in which the laser light emitting elements are disposed. Therefore, the laser light rays can enter the microscopic optical elements 25a and 25b after they become highly even light rays, or light rays having a linear shape in the cross section perpendicular to its traveling direction (similar to a light ray emitted from a linear light source).

In the first embodiment, the light sources 20a and 20b include a plurality of laser light emitting elements with an equal divergence angle and an angular luminance distribution arranged at equal intervals. Therefore, linear laser light sources with a highly even spatial luminance distribution can be obtained.

After the light ray having a linear shape in the cross section perpendicular to its traveling direction (a light ray similar to a light ray emitted from a linear light source) is produced as described above, part of light (light rays 22a and 22b) entering the microscopic optical elements 25a and 25b included in the optical element portions 27a and 27b are refracted and emitted as the illuminating light rays 33a and 33b from the surfaces of the light guide plates 21a and 21b toward the back surface 1b of the liquid crystal display element 1. The microscopic optical elements 25a and 25b are formed in the back surfaces 24a and 24b of the light guide plates 21a and 21b respectively. Now, light (light rays 22a and 22b) entering the microscopic optical elements 25a and 25b has an even spatial luminance distribution in the direction in which the laser light sources (light sources 20a and 20b) are arranged (in the Y-axis direction), or has a linear shape in the cross section perpendicular to its traveling direction (a light ray similar to a light ray emitted from a linear light source). Therefore, even illuminating light rays 33a and 33b can illuminate the liquid crystal display element 1 without uneven luminance caused by a difference in spatial luminance distributions among the light sources.

On the other hand, the planar laser light source units 200a and 200b individually include portions (optical transmission portions 26a and 26b) from which illuminating light rays are not emitted in the light traveling direction (X-axis direction). The optical transmission portions 26a and 26b are provided to convert light coming from the laser light source (punctate light source) to light having a linear shape in a cross section perpendicular to a light traveling direction (a light ray similar to a light ray emitted from a linear light source). In the first embodiment, the planar laser light source units 200a and 200b are layered to make up for the portions from which illuminating light rays are not emitted each other. That is, portions where the planar laser light source unit 200a does not emit a light ray and portions where the planar laser light source unit 200b emits a light ray (portions in the negative X-axis direction from the central position on the X-axis in FIG. 3) are layered in the Z-axis direction. Portions where the planar laser light source unit 200b does not emit a light ray and portions where the planar laser light source unit 200a emits a light ray (portions in the positive X-axis direction from the central position on the X-axis in FIG. 3) are layered in the Z-axis direction. Therefore, the first backlight unit 2 including the planar laser light source unit 200a and the planar laser light source unit 200b can emit illuminating light rays from the entire surface.

In the first embodiment, the disposition densities in the X-axis direction of the microscopic optical elements 25a and 25b that determine their individual spatial luminance distributions are optimized to form an even spatial luminance distribution by adding the spatial luminance distributions in the X-axis direction of the planar laser light source unit 200a and the planar laser light source unit 200b.

Figure 5:
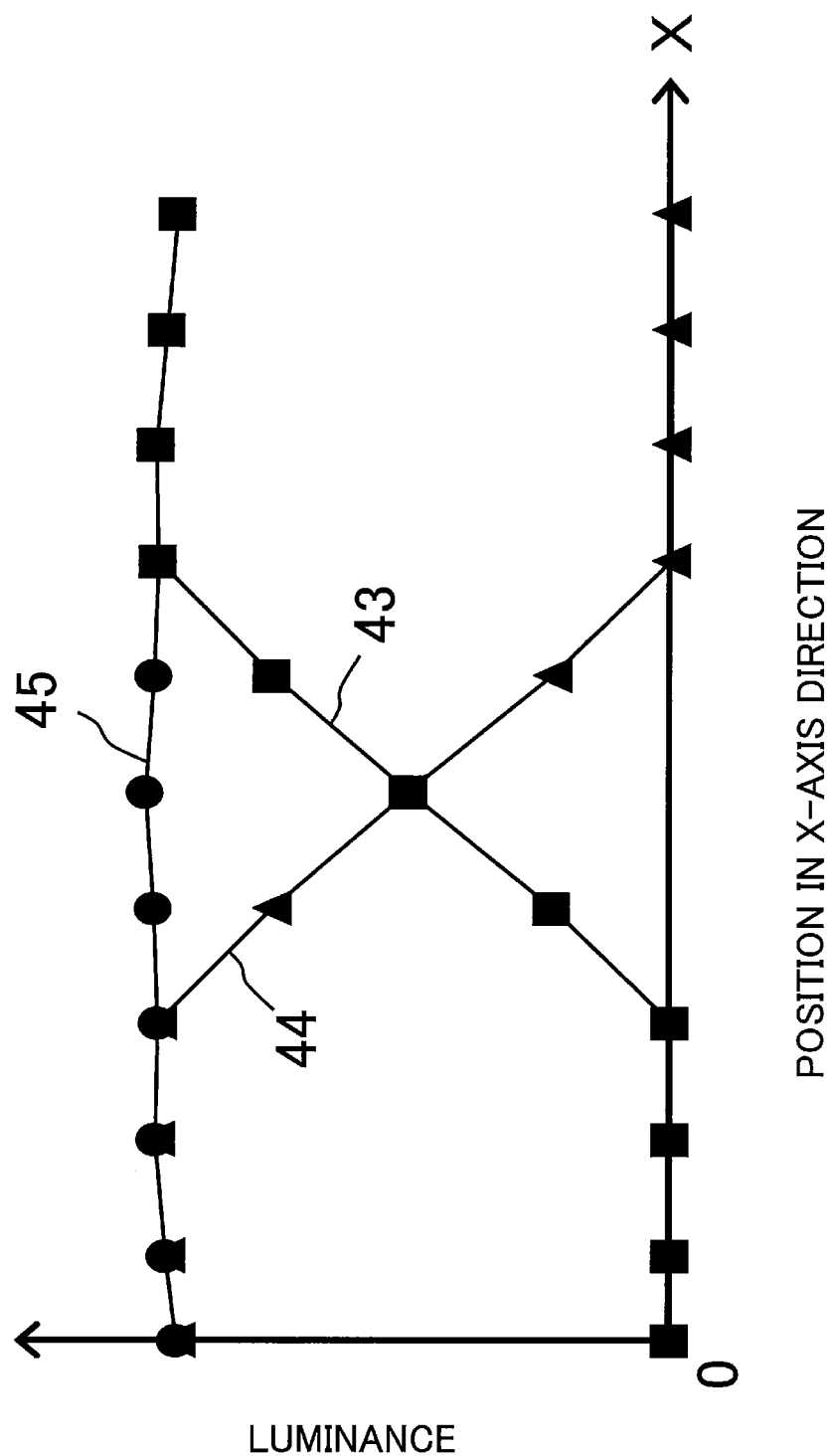
FIG. 5 is a graph showing calculation results obtained by simulation of a one-dimensional spatial luminance distribution in an X-axis direction, of illuminating light rays exited from the first backlight unit.

FIG. 5 is a graph showing a one-dimensional spatial luminance distribution in the X-axis direction of the illuminating light rays 33a and 33b emitted from the first backlight unit 2, obtained as a result of simulation. A spatial luminance distribution 43 is a one-dimensional spatial luminance distribution in the X-axis direction of the first planar laser light source unit 200a. A spatial luminance distribution 44 is a one-dimensional spatial luminance distribution in the X-axis direction of the second planar laser light source unit 200b. A spatial luminance distribution 45 is a one-dimensional spatial luminance distribution in the X-axis direction of the first backlight unit 2 formed by adding the spatial luminance distribution 43 and the spatial luminance distribution 44.

It can be inferred from the one-dimensional spatial luminance distribution 43 of the illuminating light ray 33a exited from the first planar laser light source unit 200a shown in FIG. 5 that light is not emitted from a portion from the end face 23a in the negative X-axis direction to the vicinity of the central position in the X-axis direction of the light guide plate 21a. In the one-dimensional spatial luminance distribution 43, luminance gradually increases in the positive X-axis direction from the vicinity of the central position in the X-axis direction of the light guide plate 21a and is kept to a given level of luminance in the vicinity of the end face facing the end face 23a in the positive X-axis direction. On the other hand, the one-dimensional spatial luminance distribution 44 of the illuminating light ray 33b exited from the second planar laser light source unit 200b has an inverted spatial luminance distribution of the first planar laser light source unit 200a. In the one-dimensional spatial luminance distribution 44, light is not exited from a portion from the end face 23b in the positive X-axis direction to the vicinity of the central position in the X-axis direction of the light guide plate 21b. In the one-dimensional spatial luminance distribution 44, luminance gradually increases from the vicinity of the central position in the X-axis direction of the light guide plate 21b and is kept to a given level of luminance in the vicinity of the end face facing the end face 23b in the negative X-axis direction.

Figure 6:
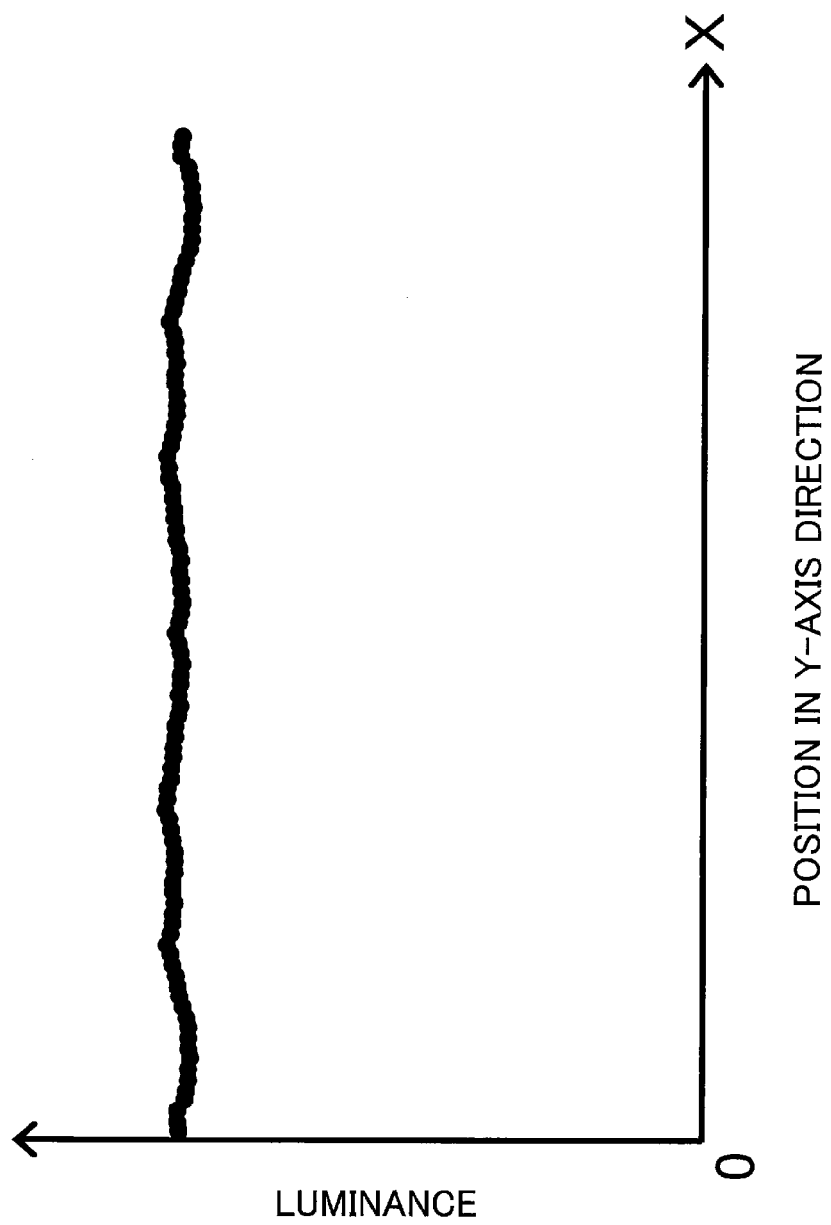
FIG. 6 is a graph showing results of actual measurement of a one-dimensional spatial luminance distribution in the X-axis direction, of the illuminating light rays exited from the first backlight unit.

The spatial luminance distribution 45 in the plane of illuminating light rays exited from the first backlight unit 2 is generated by adding the illuminating light ray 33a exited from the first planar laser light source unit 200a and the illuminating light ray 33b exited from the second planar laser light source unit 200b. Accordingly, the spatial luminance distribution 45 in the plane of illuminating light rays exited from the first backlight unit 2 becomes a uniform distribution in the X-axis direction. FIG. 6 shows results of actual spatial luminance distribution measurement in the plane of illuminating light rays exited from the first backlight unit 2 prototyped as configured in the first embodiment. As can be understood from FIG. 6, in the first backlight unit 2 including the two planar laser light source units 200a and 200b layered in the Z-axis direction, highly uniform illuminating light rays can be obtained in a laser-light traveling direction (X-axis direction).

In the first embodiment, the optical transmission portions 26a and 26b that are considered necessary to convert the light rays from the plurality of laser light sources, which are point light sources, to a light ray having a linear shape in a cross section perpendicular to a light traveling direction (a light ray similar to a light ray emitted from a linear light source) are provided in an effective image display area. Therefore, a ratio of an area of the backlight device to an area of the liquid crystal display apparatus in an image display plane (X-Y plane) can be suppressed while a sufficient optical distance is kept for traveling laser light rays. Consequently, a liquid crystal display apparatus with stylish appearance (liquid crystal display element 1 with a thin bezel) can be realized while high-quality images are provided. The bezel is a frame (cabinet) around the liquid crystal panel.

The second backlight unit 3 includes light sources 10 and a light guide plate 11. The light source 10 is a light source having a wide divergence angle and a linear spatial luminance distribution in the Y-axis direction, such as a light source utilizing an LED. The light guide plate 11 is disposed parallel to the display surface 1a of the liquid crystal display element 1. The light guide plate 11 includes an optical diffuse reflective portion 12 in its back surface (on the opposite side of the liquid crystal display element 1). The light sources 10 are disposed so as to face both end faces (light incident end faces) of the light guide plate 11 in the X-axis direction and enter light (incident light ray 13) into a center from the two end faces of the light guide plate. The incident light ray 13 travels in the light guide plate 11, which is a second light guide plate, by total reflection. Part of the incident light ray 13 that has traveled is diffusely-reflected by the optical diffuse reflective portion 12, which is a diffuse reflective structure, in the back surface and exited as the illuminating light ray 14 from a front surface (on the side of the liquid crystal display element 1) of the light guide plate 11. The illuminating light ray 14 exited from the second backlight unit 3 passes through the first backlight unit 2, the second optical sheet 32, and the first optical sheet 31 and illuminates the liquid crystal display element 1.

As described earlier, the two light guide plates 21a and 21b of the first backlight unit 2 layered (in the positive Z-axis direction) above the second backlight unit 3 are formed by transparent materials. The light guide plates 21a and 21b are plate-like members. The light guide plates 21a and 21b include microscopic optical elements 25a and 25b formed by a transparent material in their back surfaces. The light guide plates 21a and 21b exert little optical influence such as absorption and reflection on the illuminating light ray 14 passing through them. The illuminating light ray 14 here is an illuminating light ray exited from the second backlight unit 3. Therefore, the illuminating light ray 14 can be used efficiently as an illuminating light ray that illuminates the liquid crystal display element 1 with little loss of light.

The light source 10 is a light source that emits green and blue incident light rays 13. The light ray emitted from the light source 10 is combined with the red illuminating light rays 33a and 33b exited from the first backlight unit 2 and becomes white light. The light source 10 is a device formed by filling a package including monochromatic blue LEDs, for example, with green fluorescent substance which absorbs blue light and produces green light. The light source 10 includes a plurality of cyan LEDs closely arranged in the Y-axis direction. The light source 10 formed by the cyan LEDs emits cyan light having peaks in the vicinity of 450 nm and 530 nm and a continuous spectrum in the band of 420 nm to 580 nm. A light source that emits blue light and green light by a combination of an excitation light source and fluorescent substance, for example, can be used as the light source 10. Alternatively, an LED or a fluorescent lamp configured to emit blue light or green light by exciting green fluorescent substance by blue light can also be used as the light source 10.

The light guide plate 11 is a 4 mm-thick plate-like member formed by a transparent material, for example. The light guide plate 11 includes the optical diffuse reflective portion 12 in its back surface. The optical diffuse reflective portion 12 is a diffuse reflective structure for directing light exited from the light source 10 toward the back surface 1b of the liquid crystal display element 1. The optical diffuse reflective portion 12 can be formed by applying spots of a diffuse reflective material on the back surface of the light guide plate 11, for example. The spots of the applied diffuse reflective material are distributed so that the density is low in the vicinity of the light incident end from the light source 10, increases as the distance from the light source 10 increases, and maximizes in the center in the X-axis direction of the light guide plate 11. This makes it possible to uniform spatial luminance distributions in the X-Y plane of the illuminating light rays 14 exited from the light guide plate 11.

The laser light source is a point light source with a high directionality. Therefore, one conventional problem is uneven luminance in a plane. In the liquid crystal display apparatus 100 in the first embodiment, even if laser light sources (light sources 20a and 20b) are used, illuminating light rays with uniform spatial luminance distribution in a plane can be generated, as described above. That is because a sufficient optical traveling distance is provided to let neighboring laser light rays overlap spatially one another because of their intrinsic divergence angles until they form light having a linear shape in a cross section perpendicular to a traveling direction (a light ray similar to a light ray emitted from a linear light source). Therefore, a liquid crystal display apparatus that can display a high-quality image with suppressed unevenness in luminance can be provided. In the first embodiment, the configuration described above is provided a simple structure by using the effective image display area of the liquid crystal display apparatus effectively. Therefore, the liquid crystal display apparatus can be realized without increasing the size of the backlight device with respect to the effective image display area.

In the first embodiment, the light source of the first backlight unit 2 is a laser light source, but the light source is not limited to the laser light source and may be another light source that has a small light emitting area similarly to the laser light source and has a divergence angle. By using that type of light source, like a laser light source, a planar light source with highly uniform spatial luminance distribution in the plane can be created. For example, by using an LED light source, a high effect can be obtained. With laser, however, an effect described below can be obtained.

The liquid crystal display apparatus 100 in the first embodiment includes a red laser and a cyan LED. The cyan LED includes a monochromatic blue LED and a green fluorescent substance which absorbs blue light and emits green light. By using highly monochromatic lasers as the light sources 20a and 20b of the backlight unit 2, chromatic purity of display colors can be improved than when a monochromatic LED or a multicolor LED is used. Therefore, the liquid crystal display apparatus 100 using lasers as the light sources 20a and 20b can display more vivid colors than a liquid crystal display apparatus using another light source. In comparison with a monochromatic LED, a laser has a higher output and higher photoelectric conversion efficiency at an input of a high current, so that a small device with high power and low power consumption can be implemented.

The liquid crystal display apparatus 100 in the first embodiment uses a red laser because of the reasons explained below.

A white LED widely used in the conventional backlight device emits a light ray in the red color range with a small amount of energy. Particularly, the proportion of light in the wavelength range of 630 to 640 nm preferable as pure red in the red color range is very small. Therefore, if it is tried to improve the chromatic purity in this wavelength region, the amount of transmitted light decreases extremely, thereby lowering luminance considerably. Moreover, humans are highly sensitive to a color difference in the red color. For example, a monochromatic red LED having a narrower wavelength bandwidth than the white LED has a wavelength bandwidth of several tens of nanometers. On the contrary, the wavelength bandwidth of the red laser is just several nanometers. The wavelength bandwidth of the red color is perceived as a conspicuous difference by human eyes. The wavelength bandwidth here means the difference in chromatic purity.

Therefore, replacement of the red light among three primary colors with a red laser light produces a high effect in lowering the power consumption and improving the chromatic purity. From these reasons, the liquid crystal display apparatus 100 in the first embodiment uses a laser for the red light source. The red laser light ray here has a wavelength within the wavelength band of 630 to 650 nm as its dominant wavelength, more preferably a wavelength within the wavelength band of 630 to 640 nm as its dominant wavelength.

A white LED having a continuous spectrum from blue to red or a monochromatic red LED having a broad wavelength bandwidth has been used conventionally. In that case, part of red light passes through a green filter having an adjacent spectrum, thereby lowering chromatic purity of green color as well. In the liquid crystal display apparatus 100 of the first embodiment, however, the increased chromatic purity of the red color decreases the amount of red light passing through the green filter, so that the chromatic purity of the green color can be improved.

In the liquid crystal display apparatus 100, blue light and green light are generated by the cyan LED including a monochromatic blue LED and a fluorescent substance which absorbs blue light and emits green light. For the green color, use of a monochromatic LED or a monochromatic laser for emitting green light may be possible. Simple and small monochromatic LEDs and monochromatic lasers that can be applied to a display are inferior to a multicolor LED using a fluorescent substance in terms of low power consumption and high power. So, the liquid crystal display apparatus 100 in the first embodiment uses a fluorescent substance for green light, instead of light emitting elements such as a monochromatic LED or a monochromatic laser, in order to simplify and downsize the device and to lower power consumption.

In the first embodiment, as alight source for emitting blue light and exciting a green fluorescent substance, a monochromatic blue LED is used. It is also effective to use a blue laser instead of the monochromatic blue LED for the purpose of broadening the color reproduction range. When a blue light-emitting element is configured to excite a fluorescent substance to obtain a different color of light, similarly to the light source 10 of the first embodiment, use of the LED is preferable to use of a laser.

The reason is as follows: While the LED is driven by a low current and provides a low output, the laser is driven by a high current and provides a high output. The driven laser generates a very large amount of heat. While light emitted from the LED has a wide divergence angle, light emitted from the laser has a very narrow divergence angle. With the laser, the density of intensity of excitation light incident to the fluorescent substance (intensity of incident light per unit area of fluorescent substance) becomes very high. Part of light absorbed by the fluorescent substance is converted to another wavelength and exited to the outside, and most of the remaining part of light is converted to thermal energy. Generally, internal conversion efficiency of the fluorescent substance (the amount of light converted to light having another wavelength with respect to the amount of absorbed light) ranges approximately from 40% to 80%. The thermal energy generated at the same time accounts for 20% to 60% of the energy of incident light. Accordingly, if a high-power laser light ray with a high density of intensity enters, the fluorescent substance generates a very large amount of heat.

The increased amount of heat generated by the laser including the fluorescent substance would raise the temperature of the fluorescent substance. The increased amount of heat generated by the fluorescent substance itself would also raise the temperature of the fluorescent substance. The increased temperature of the fluorescent substance would lower internal conversion efficiency of the fluorescent substance significantly, thereby lowering luminance or increasing power consumption. Therefore, the light source 10 in the first embodiment uses a cyan LED that includes a blue LED and a fluorescent substance which emits green light when excited by the blue light, to emit cyan light.

The liquid crystal display apparatus 100 in the first embodiment uses a laser only for the red color of the three primary colors and uses the cyan LED for the blue color and green color, as described above. The cyan LED includes a monochromatic blue LED and a fluorescent substance that absorbs the blue light and emits green light. Accordingly, in comparison with the conventional liquid crystal display apparatuses using a white LED, monochromatic LEDs of the three primary colors, or monochromatic lasers of the three primary colors, a liquid crystal display apparatus that implements a wide color reproduction range with low power consumption can be provided by the simple and inexpensive configuration.

In the first embodiment, as the light source of the first backlight unit, a red laser light source having a peak wavelength at 640 nm is used, but the light source of the first backlight unit is not confined to that. A red laser having a different wavelength, for example, may be used as the light source of the first backlight unit. It is also effective to use an LED which emits monochromatic light with a comparatively high monochromaticity, as the light sources 20a and 20b of the first backlight unit 2. In order to obtain a broader color reproduction region, use of a laser light source having the narrowest possible spectral width has a greater effect on expanding the color reproduction region. The laser light source having a narrow spectral width is a laser light source having a high monochromaticity. In the first embodiment, the light source 10 of the second backlight unit 3 must use a light source for radiating light of a complementary color needed to create white light, with respect to the monochromatic light sources 20a and 20b used as the light sources of the first backlight unit 2.

If a light source having a continuous spectrum such as a white LED is used and if the chromatic purity is improved by narrowing the wavelength that can pass through the color filter included in the liquid crystal display element, the loss of light (optical loss) by the color filter would increase, thereby lowering the luminance of an image. In the first embodiment, the chromatic purity is improved by improving the monochromaticity of the light source. Therefore, the loss of light (optical loss) decreases, and the decrease of luminance of the image can be reduced. The chromatic purity can be improved while low power consumption is maintained.

In comparison with a monochromatic LED light source, a monochromatic laser light source has a higher monochromaticity and can be driven by a lower power. The monochromatic laser light source has an advantage of improving coupling efficiency to the light guide plate because of its high directionality.

In the first embodiment, the first backlight unit 2 formed by layering the plurality of planar light sources includes the light guide plates 21a and 21b and the microscopic optical elements 25a and 25b provided in the light guide plates and all of these members are formed by transparent materials. In the backlight device 300 formed by layering the plurality of backlight units 2 and 3, the light guide plate disposed on the positive Z-axis side (upper layer) and the microscopic optical elements provided in the light guide plate are formed by transparent materials. Therefore, the loss of light coming from the backlight unit provided on the negative Z-axis side (lower layer) can be suppressed, and high usage efficiency of light can be obtained. It is because the light guide plate disposed on the positive Z-axis side (upper layer) and the microscopic optical elements are formed by transparent materials.

In the first embodiment, the plurality of planar laser light source units 200a and 200b included in the first backlight unit 2 have similar characteristics, but the present invention is not confined to the configuration. As described above, the illuminating light rays exited from the plurality of planar laser light source units are added up in the X-Y plane direction in the first embodiment. This accounts for the first backlight unit having a uniform planar spatial luminance distribution. The configuration of adding up the illuminating light rays in the X-Y plane direction is a factor of the invention. If the factor is achieved, the planar spatial luminance distribution of the illuminating light rays exited from the plurality of planar laser light source units may be different.

In the first embodiment, the two (a pair of two) planar laser light source units 200a and 200b including the light sources 20a and 20b respectively are layered, but another configuration can be adopted. If the illuminating light rays for illuminating the entire liquid crystal display element evenly are generated by adding up the illuminating light rays exited from the planar laser light source units, just a single planar laser light source unit may be configured, and alternatively, three or more planar laser light source units may be layered.

As described above, the illuminating light rays exited from the plurality of planar laser light source units are added up in the X-Y plane direction. Therefore, the first backlight unit has a uniform planer spatial luminance distribution. In this configuration, each of the planar laser light source units may have any planar spatial luminance distribution. Any number of planar laser light source units can be layered. Then, it is preferable that the light guide plate included in each of the planar laser light source units have an optical transmission portion in the vicinity of an incident end of the laser light source. The optical transmission portion has an optical transmission distance required to allow a light ray emitted from a laser light emitting element to overlap spatially a light ray emitted from an adjacent laser light emitting element and to uniform a spatial luminance distribution in a direction in which the laser light emitting elements are arranged. The optical transmission portion does not include the microscopic optical elements. Since the optical transmission portion is provided, a laser light ray entering the optical element portion becomes light having a linear shape in a cross section perpendicular to a light traveling direction (a light ray similar to a light ray emitted from a linear light source). Therefore, the illuminating light rays refracted by the microscopic optical elements and exited from the front surface of the light guide plate toward the back surface 1b of the liquid crystal display element 1 do not have unevenness in luminance distribution. Accordingly, the liquid crystal display apparatus 100 that offers a high picture quality with suppressed display unevenness (unevenness in luminance and colors) can be provided.

If the configuration described above can be achieved, the laser light source disposition interval and the disposition of the laser light source such as an orientation and an angle of the laser light source with respect to the incident end face of the light guide plate are not limited. The laser light source may face any end face of the four faces of the light guide plate. Then, by brining the incident end face of the laser light source to the short-side end face of the liquid crystal display apparatus, the optical transmission distance of the laser light ray can be increased efficiently. Therefore, illuminating light rays with highly uniform planar spatial luminance distribution can be obtained.

According to the first embodiment, the laser light ray first travels a sufficiently long optical transmission distance in the light guide plate by multiple reflection. Next, a plurality of laser light rays are overlapped spatially. Accordingly, speckle noise suffering the conventional image display apparatus utilizing a high coherent laser light source is reduced.

Second Embodiment

Figure 7:
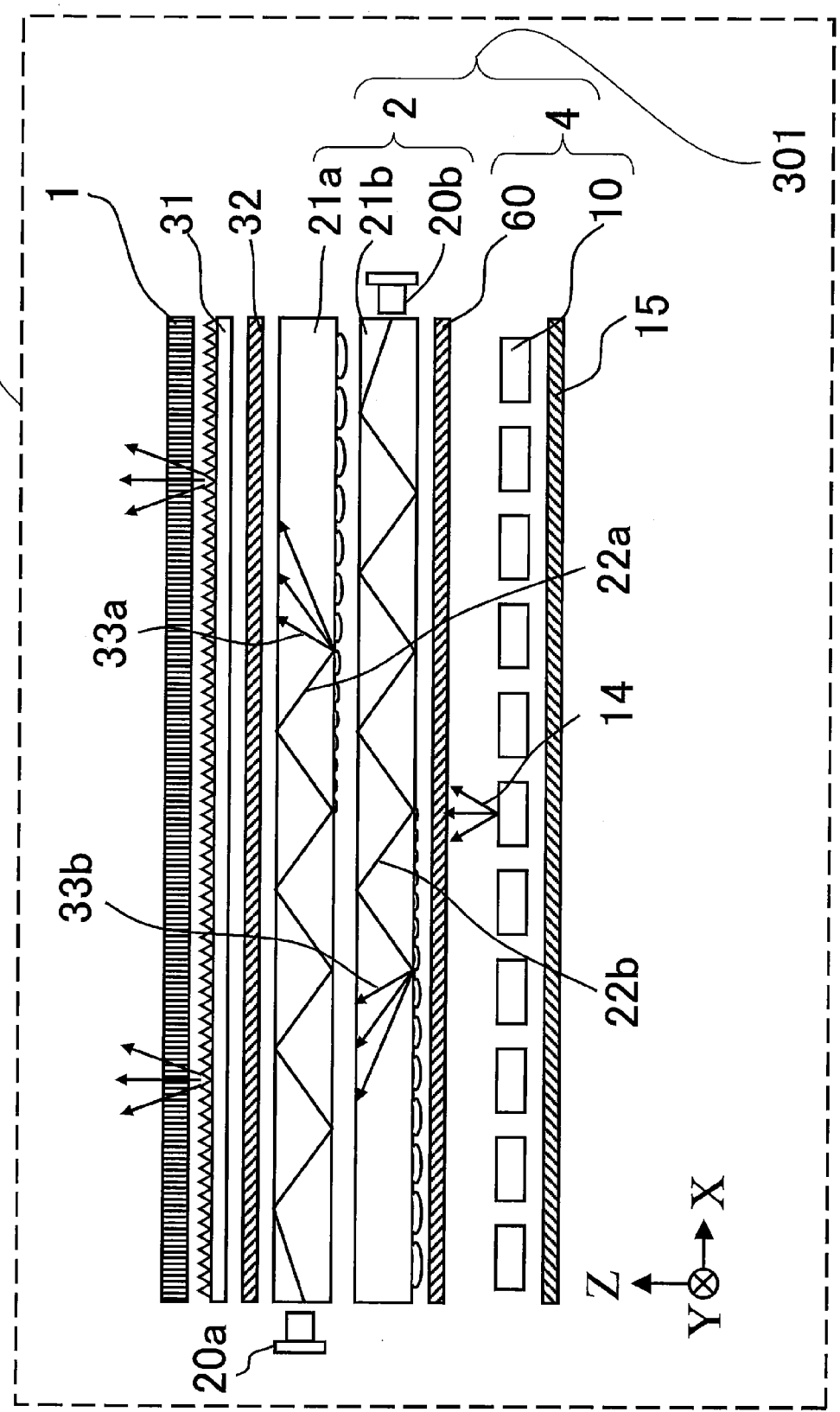
FIG. 7 is a diagram schematically showing structure of a liquid crystal display apparatus in a second embodiment.

FIG. 7 is a diagram schematically showing structure of a liquid crystal display apparatus (transmission-type liquid crystal display apparatus) 600 according to a second embodiment of the present invention. A backlight device in the second embodiment includes a first backlight unit 2 and a second backlight unit 4. The liquid crystal display apparatus 600 in the second embodiment differs from the liquid crystal display apparatus 100 in the first embodiment in that the second backlight unit 3 of the liquid crystal display apparatus 100 of the first embodiment is replaced with the second backlight unit 4 having a different structure. Otherwise, the liquid crystal display apparatus 600 of the second embodiment is basically the same as the liquid crystal display apparatus 100 of the first embodiment. In FIG. 7, elements that are identical to or correspond to the elements of the liquid crystal display apparatus 100 described in the first embodiment (FIG. 1) are denoted by the same reference numerals.

The second backlight unit 4 has a plurality of light sources that emit cyan light having a wide divergence angle, like the light sources 10 provided on the second backlight unit 3 in the first embodiment. The plurality of light sources 10 are disposed two-dimensionally in an X-Y plane immediately below the first backlight unit 2 (in a negative Z-axis direction). The second backlight unit 4 is a backlight unit immediately below the light source. Here, a light source that emits cyan light with a wide divergence angle is a cyan LED, for example. Light emitted from the light source 10 is diffused by a diffusing plate 60, then passes through the first backlight unit 2, a first optical sheet 32, and a second optical sheet 31, and illuminates a back surface 1b of a liquid crystal display element 1.

The diffusing plate 60 is provided to diffuse and transmit light emitted from the light sources 10 arranged two dimensionally in the second backlight unit 4. The diffusing plate 60 is formed by a material having a high optical diffusion capability (degree of diffusion) so that light having a high uniformity in the plane can be generated from illuminating light rays 14 coming from the light source 10.

The second backlight unit 4 is effective when a large amount of luminescence is required. A large amount of luminescence is required when the liquid crystal display apparatus 600 has a large screen or when the blue band or green band of a color filter of the liquid crystal display element 1 is narrowed to expand a color reproduction range, for example. In those cases, sufficient brightness can be kept by using the second backlight unit 4 immediately below the light source.

Third Embodiment

Figure 8:
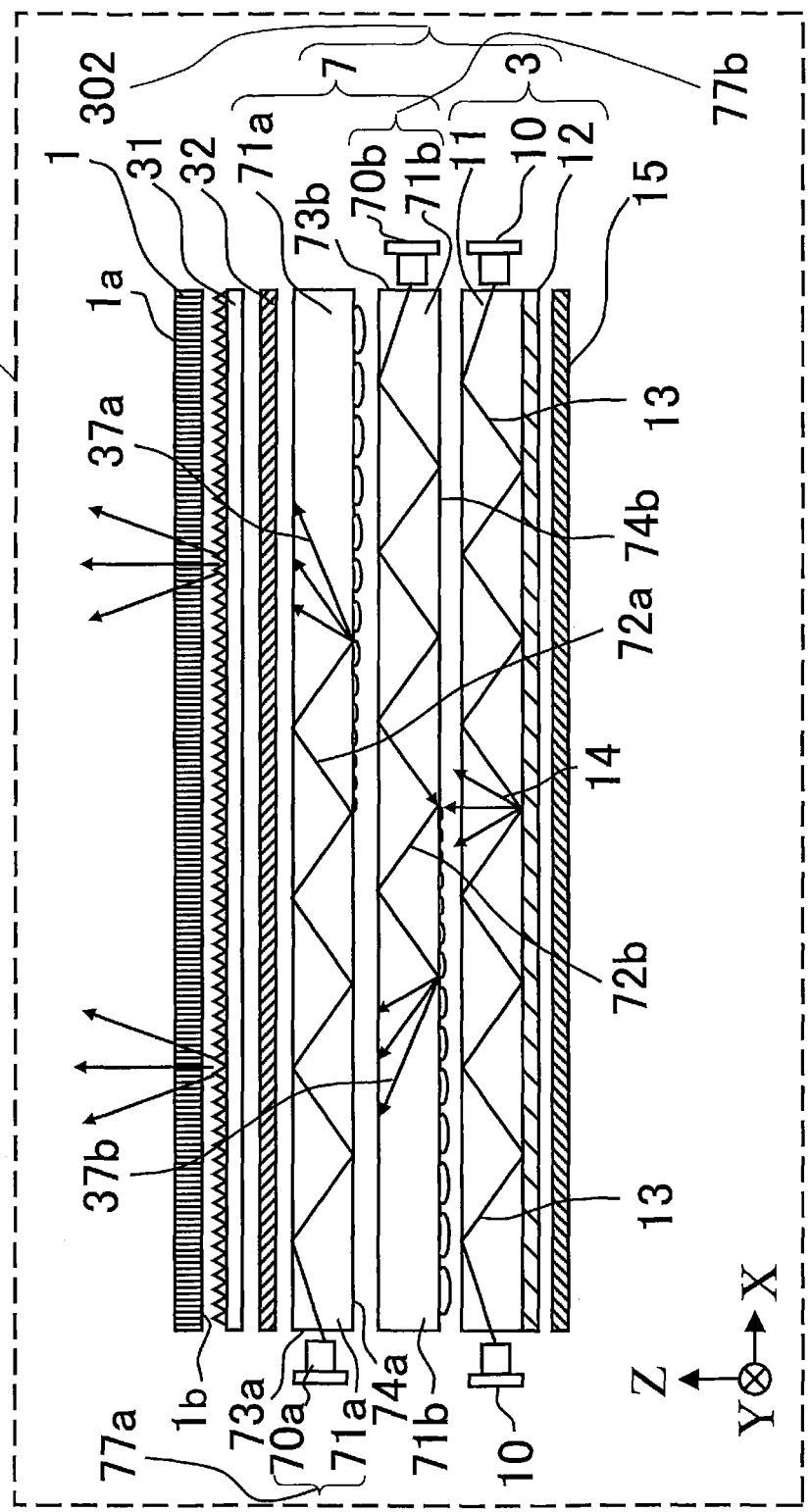
FIG. 8 is a diagram schematically showing structure of a liquid crystal display apparatus in a third embodiment.

FIG. 8 is a diagram schematically showing structure of a liquid crystal display apparatus (transmission-type liquid crystal display apparatus) 700 according to a third embodiment of the present invention. A backlight device in the third embodiment includes a first backlight unit 7 and a second backlight unit 3. The liquid crystal display apparatus 700 in the third embodiment is a more suitable form of the liquid crystal display apparatus 100 in the first embodiment. In the liquid crystal display apparatus 700 in the third embodiment, conditions of an optical transmission portion are studied in detail and improved. In FIG. 8, elements having functions identical to or corresponding to the elements used in the first embodiment (FIG. 1) are denoted by the same reference numerals. Elements that will be described in detail in the third embodiment are denoted by new reference numerals, separately from the elements of the first embodiment.

In the liquid crystal display apparatus 700 in the third embodiment, the first backlight unit 7 converts red light rays (outgoing light rays) 72a and 72b emitted as first light rays from light sources 70a and 70b as first light sources into illuminating light rays 37a and 37b traveling in a positive Z-axis direction and exits them toward a back surface 1b of a liquid crystal display element 1. The illuminating light rays 37a and 37b pass through a second optical sheet 32 and a first optical sheet 31 and are applied to the back surface 1b of the liquid crystal display element 1.

The first backlight unit 7 includes a first planar laser light source unit 77a and a second planar laser light source unit 77b. The first planar laser light source unit 77a includes the light source 70a and a light guide plate 71a. It is preferable that the light guide plate 71a be disposed in parallel to a display surface 1a of the liquid crystal display element 1. The second planar laser light source unit 77b includes the light source 70b and a light guide plate 71b. It is preferable that the light guide plate 71b be disposed in parallel to the display surface 1a of the liquid crystal display element 1.

Figure 9:
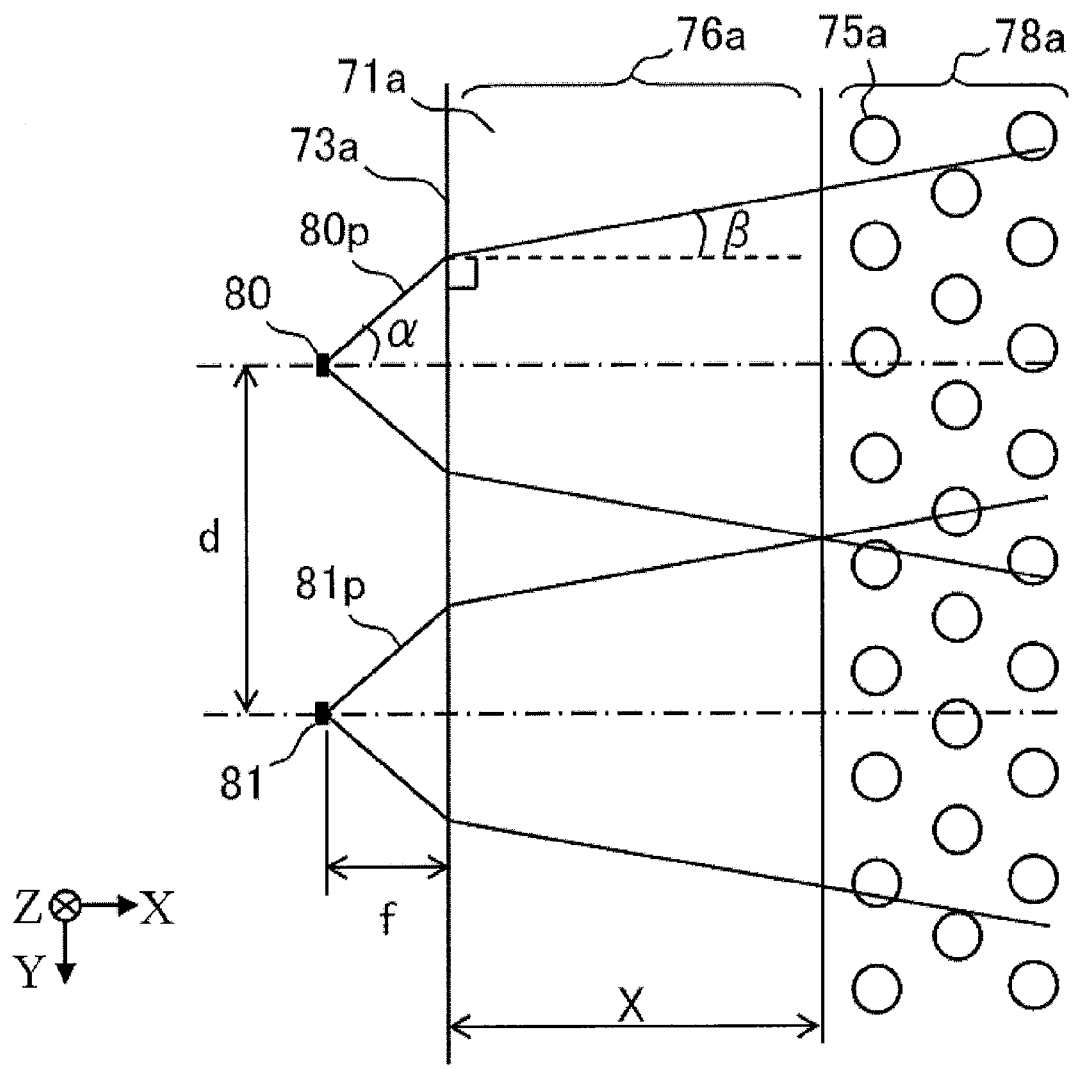
FIG. 9 is a conceptual drawing showing optical paths of laser light rays in an optical transmission portion.

The light source 70a included in the first planar laser light source unit 77a is disposed so as to face an end face 73a of the light guide plate 71a in a negative X-axis direction. The light guide plate 71a is a first light guide plate. The end face 73a is a light incidence end face. For example, the light source 70a includes a plurality of laser light emitting elements arranged at equal intervals in a Y-axis direction. The light guide plate 71a included in the first planar laser light source unit 77a is formed by a transparent material. The light guide plate 71a is a plate-like member. A back surface 74a of the light guide plate 71a has microscopic optical elements 75a, which are optical element portions, as shown in FIG. 9. The back surface 74a is a face of the light guide plate 71a on the opposite side of the liquid crystal display element 1 (on the side in a negative Z-axis direction). Light emitted from the light source 70a enters the light guide plate 71a from the end face 73a of the light guide plate 71a and travels in the light guide plate 71a by total reflection.

Likewise, the light source 70b included in the second planar laser light source unit 77b is disposed so as to face an end face 73b of the light guide plate 71b in an X-axis direction. The light guide plate 71b is a first light guide plate. The end face 73b is a light incidence end face. For example, the light source 70b is a plurality of laser light emitting elements arranged at equal intervals in the Y-axis direction. The light guide plate 71b included in the second planar laser light source unit 77b is formed by a transparent material. The light guide plate 71b is a plate-like member. The light guide plate 71b has microscopic optical elements 75b, which are optical element portions, in a back surface 74b. The back surface 74b is a face of the light guide plate 71b on the opposite side of the liquid crystal display element 1 (on the side in the negative Z-axis direction). Light emitted from the light source 70b enters the light guide plate 71b from the end face 73b of the light guide plate 71b and travels in the light guide plate 71b by total reflection.

It is preferable that the light source 70a included in the first planar laser light source unit 77a and the light source 70b included in the second planar laser light source unit 77b use laser light emitting elements having the same characteristics. It is also preferable that intervals at which the laser light emitting elements are disposed in the light source 70a be the same as intervals at which the laser light emitting elements are disposed in the light source 70b and that positional relationships (distance, angle, etc.) between the laser light emitting elements and the end face 73a of the light guide plate 71a are the same as positional relationships (distance, angle, etc.) between the laser light emitting elements and the end face 73b of the light guide plate 71b. It is further preferable that the light guide plate 71a and the light guide plate 71b included in the first planar laser light source unit 77a and the second planar laser light source unit 77b respectively have the same structure. That is, it is preferable that the first planar laser light source unit 77a and the second planar laser light source unit 77b have the same characteristics.

In the first backlight unit 7, the first planar laser light source unit 77a and the second planar laser light source unit 77b having mutually equal characteristics have such positional relationships that they are rotated by 180 degrees around a normal line (line in a Z-axis direction in FIG. 8) to the display surface 1a, in a central position of the display surface 1a of the liquid crystal display element 1. The light guide plate 71a and the light guide plate 71b are layered so that side faces (end faces) of the light guide plate 71a and side faces (end faces) of the light guide plate 71b are aligned in the same planes. That is, the light source 70a and the light source 70b are disposed so as to face each other. Here, the light source 70a is a light source included in the first planar laser light source unit 77a. The light source 70b is a light source included in the second planar laser light source unit 77b. The light source 70a emits a light ray (outgoing light ray) 72a in a positive X-axis direction. The light source 70b emits a light ray (outgoing light ray) 72b in the negative X-axis direction. The light rays 72a and 72b emitted respectively from the light sources 70a and 70b travel in opposite directions. However, any of the illuminating light rays 37a and 37b exited from the planar laser light source units 77a and 77b are exited toward the back surface 1b of the liquid crystal display element 1.

In the first backlight unit 7 in the third embodiment, the two planar laser light source units 77a and 77b are layered in the direction (positive Z-axis direction) in which the illuminating light rays are exited, as described above. Accordingly, the illuminating light rays exited from the first backlight unit 7 are a collection of the illuminating light rays 37a and 37b exited from the two planar laser light source units 77a and 77b. The illuminating light rays 37a and 37b exited from the first backlight unit 7 are illuminating light rays obtained when the light sources 70a and 70b included in the first backlight unit 7 are lit up. Therefore, a spatial luminance distribution in an X-Y plane of the illuminating light rays exited from the first backlight unit 7 becomes a collection of spatial luminance distributions in the X-Y plane of the two planar laser light source units 77a and 77b.

The light guide plates 71a and 71b are formed by a transparent material such as an acrylic plastic (PMMA). The light guide plates 71a and 71b are plate-like members having a thickness of 2 mm, for example. The light rays (laser light rays) 72a and 72b entering the light guide plates 71a and 71b from the end faces 73a and 73b travel in the X-axis direction by repeating reflection in the light guide plates 71a and 71b, by total reflection at the interface between air and the light guide plates 71a and 71b. The light guide plates 71a and 71b include optical transmission portions 76a and 76b, which are first spatial luminance distribution conversion portions, and optical element portions 78a and 78b, which are second spatial luminance distribution conversion portions. The optical transmission portions 76a and 76b are portions for transmitting the light rays 72a and 72b emitted from the light sources 70a and 70b just in the light guide plates 71a and 71b. The microscopic optical elements 75a and 75b change the traveling direction of the light rays 72a and 72b traveling in the X-axis direction through the optical transmission portions 76a and 76b mainly to the Z-axis direction (direction toward the liquid crystal display element 1).

The optical transmission portions 76a and 76b included in the light guide plates 71a and 71b are disposed in the vicinity of the end faces 73a and 73b. The light rays 72a and 72b emitted from the light sources 70a and 70b enter the light guide plates 71a and 71b from the end faces 73a and 73b. Then, the light rays 72a and 72b travel in the X-axis direction in the optical transmission portions 76a and 76b. In the optical transmission portions 76a and 76b, front surfaces (faces on the side of the liquid crystal display element 1) and the back surfaces (faces on the opposite side of the liquid crystal display element 1) of the light guide plates 71a and 71b do not have special structures such as projections and are plane surfaces. The light ray 72a enters the light guide plate 71a. The light ray 72b enters the light guide plate 71b. Therefore, the light rays 72a and 72b traveling in the optical transmission portions 76a and 76b travel, while keeping their own divergence angles and traveling directions. The light rays 72a and 72b emitted from the light sources 70a and 70b spread spatially by their own divergence angles while traveling in the optical transmission portions 76a and 76b.

As shown in FIG. 9, the optical transmission portions 76a and 76b included in the first light guide plates 71a and 71b of the third embodiment uniform a one-dimensional spatial luminance distribution in the Y-axis direction formed by adding laser light rays 80p and 81p especially. The laser light rays 80p and 81p are emitted from adjacent laser light emitting elements 80 and 81. Accordingly, the optical transmission portions 76a and 76b require a given optical distance X in the X-axis direction.

The optical element portions 78a and 78b included in the light guide plates 71a and 71b have the microscopic optical elements 75a and 75b having a which are point light sources, spread by their own divergence angles while traveling in the optical transmission portions 76a and 76b. The light rays (light rays 72a and 72b) spreading by their own divergence angles spatially overlap adjacent laser light rays (light rays 72a and 72b) to form light having a uniform spatial luminance distribution in a direction in which the laser light emitting elements 80 and 81 are arranged (Y-axis direction), or light having a linear shape in a cross section perpendicular to a light traveling direction (a light ray similar to a light ray emitted from a linear light source). The light rays having a linear shape in the cross section perpendicular to the light traveling direction enter the microscopic optical elements 75a and 75b and become the even illuminating light rays 37a and 37b exited toward the back surface 1b of the liquid crystal display element 1.

The light rays 72a and 72b emitted from the light sources 70a and 70b, which are point light sources, spread by their own divergence angles while traveling in the optical transmission portions 76a and 76b. The light rays (light rays 72a and 72b) spreading by their own divergence angles spatially overlap adjacent laser light rays (light rays 72a and 72b) to form light having a uniform spatial luminance distribution in a direction in which the laser light emitting elements 80 and 81 are arranged (Y-axis direction), or light having a linear shape in a cross section perpendicular to a light traveling direction (a light ray similar to a light ray emitted from a linear light source). The light rays having a linear shape in the cross section perpendicular to the light traveling direction enter the microscopic optical elements 75a and 75b and become the even illuminating light rays 37a and 37b exited toward the back surface 1b of the liquid crystal display element 1.

Taking the laser light emitting element 80 included in the light source 70a and the laser light emitting element 81 adjacent to it in the Y-axis direction as an example, the optical transmission portions 76a and 76b included in the first light guide plates 71a and 71b of the third embodiment will be described in detail.

Figure 10:
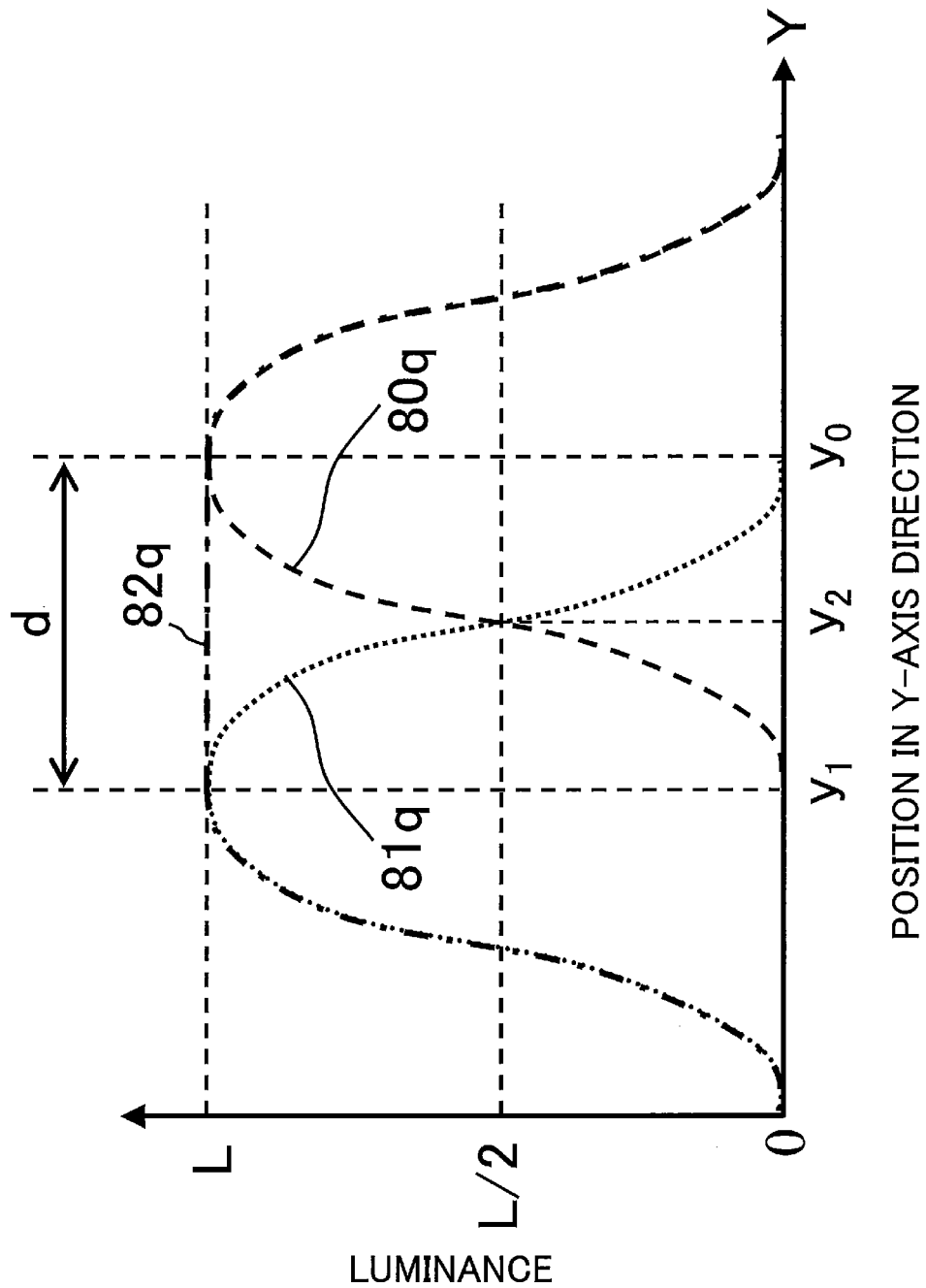
FIG. 10 is a graph showing a one-dimensional spatial luminance distribution in a Y-axis direction, of a laser light ray after it passes through the optical transmission portion.

FIG. 9 is a conceptual drawing showing the optical paths of the laser light rays 80p and 81p. The laser light rays 80p and 81p are emitted from the laser light emitting elements 80 and 81 and enter the light guide plate 71a from its end face 73a. FIG. 10 is a graph showing one-dimensional spatial luminance distributions 80q and 81q and a one-dimensional spatial luminance distribution 82q formed by collecting the preceding distributions, of light having a linear shape in the cross section perpendicular to the light traveling direction. The one-dimensional spatial luminance distributions 80q and 81q are spatial luminance distributions in the Y-axis direction of the laser light rays 80p and 81p traveling through the optical transmission portion 76a having the optical distance X in the X-axis direction.

As shown in FIG. 9, the laser light emitting elements 80 and 81 are adjacent to each other in the Y-axis direction, leaving a distance d between them. The laser light emitting elements 80 and 81 are disposed so as to face the end face 73a of the light guide plate 71a. A distance f is kept between light emitting faces of the laser light emitting elements 80 and 81 and the end face 73a. The laser light emitting elements 80 and 81 have the same characteristics. Approximately Gaussian angular luminance distributions at the half width at half maximum a in the X-Y plane of the laser light rays 80p and 81p emitted from the laser light emitting elements 80 and 81 have the same shapes. The half width at half maximum indicates an angle in an angular luminance distribution at which luminance becomes a half of the highest luminance, with respect to the center (zero degrees) at which luminance becomes the highest.

The laser light rays 80p and 81p emitted from the laser light emitting elements 80 and 81 enter the light guide plate 70a from the end face 73a and travels in the optical transmission portion 76a. The optical distance X in the X-axis direction of the optical transmission portion 76a is defined by an expression (1), where d is the distance between light emitting points of the laser light emitting elements 80 and 81; f is the distance between the emitting faces of the laser light emitting elements 80 and 81 and the end face 73a; α is the half width at half maximum of the divergence angle in the X-Y plane of the light rays emitted from the laser light emitting elements 80 and 81; and β is the half width at half maximum of the divergence angle in the X-Y plane of the laser light rays 80p and 81p traveling in the light guide plate 71a.

$$X = \frac{d - 2 \cdot f \cdot \tan\alpha}{2 \cdot \tan\beta} \quad (1)$$

The half width at half maximum β in the light guide plate 71a is defined by an expression (2). Here, let a refractive index of a layer in which the laser light rays 80p and 81p emitted from the laser light emitting elements 80 and 81 travel before entering the light guide plate 71a be $n_1$ and a refractive index of the light guide plate 71a be $n_2$.

$$\beta = \operatorname{Sin}^{-1}\left(\frac{n_1}{n_2} \cdot \sin\alpha\right) \quad (2)$$

Here, light emitting areas of the laser light emitting elements 80 and 81 are small enough with respect to the distance d between the light emitting points of the laser light emitting elements 80 and 81, and their magnitude is ignored.

The expressions (1) and (2) define a necessary optical distance X at which the laser light ray 80p and the laser light ray 81p have an intersection point in such a position where luminance is a half of the peak luminance on the corresponding optical axes in the spatial luminance distribution in the Y-axis direction.

The laser light rays 80p and 81p have the same angular luminance distribution and have an angular luminance distribution symmetrical about their own optical axis. When the laser light rays 80p and 81p travel the optical distance X defined by the expressions (1) and (2), the laser light rays 80p and 81p have a luminance L/2 at an intermediate point (Y=$y_2$) between the points of peak luminance L (Y=$y_0$, $y_1$) as shown in FIG. 10. When the laser light rays 80p and 81p overlap each other, luminance at the intermediate point (Y=$y_2$) becomes L. Conventionally, unevenness in luminance is generated by dark parts provided between bright parts provided on the optical axes of the laser light rays 80p and 81p. With the optical distance X defined by the expressions (1) and (2), a bright part (Y=$y_2$) having the same luminance as the bright parts (Y=$y_0$, $y_1$) formed by the laser light rays 80p and 81p can be interpolated between the bright parts (Y=$y_0$, $y_1$). Since the spatial luminance distributions of the bright parts (Y=$y_0$, $y_1$) are averaged out, light having a linear shape in the cross section perpendicular to the light traveling direction (a light ray similar to a light ray having a highly uniform luminance distribution from a linear light source) can be generated.

The laser light rays 80p and 81p travel through the optical transmission portion 76a having the optical distance X defined by the expressions (1) and (2), as described above. Accordingly, while the size of the optical transmission portion 76a is minimized, light having a linear shape in the cross section perpendicular to the light traveling direction, with a uniform spatial luminance distribution in the Y-axis direction can be generated.

The microscopic optical elements 75a are provided in an area from the end portion in the positive X-axis direction of the optical transmission portion 76a to the end portion in the positive X-axis direction of the light guide plate 71a. They are disposed so that the disposition density continuous varies from low to high in the positive X-axis direction. The structure and the characteristics of the microscopic optical elements 75a are the same as those described in the first embodiment.

The light ray 72a (laser light ray) is emitted from the light source 70a and travels in the optical transmission portion 76a of which length in the X-axis direction equals the optical distance X. The laser light ray 72a becomes light having a uniform spatial luminance distribution in the direction in which the light sources 70a are arranged (Y-axis direction), or light having a linear shape in the cross section perpendicular to the light traveling direction (a light ray similar to a light ray emitted from a linear light source), then enters the optical element portion 75a, and becomes a planar light source having a uniform planer spatial luminance distribution and illuminates the liquid crystal display element 1.

The first planar laser light source unit 77a has been described. The second planar laser light source unit 77b also includes the optical transmission portion 76b that satisfies the expressions (1) and (2). The light ray 72b (laser light ray) becomes a light ray having high uniformity, or light having a linear shape in the cross section perpendicular to the light traveling direction (a light ray similar to a light ray emitted from a linear light source), enters the microscopic optical elements 75b, and becomes a planar light source having a uniform planer spatial luminance distribution and illuminates the liquid crystal display element 1.

As an aggregation of the first planar laser light source unit 77a and the second planar laser light source unit 77b, the first backlight unit 7 becomes a planar light source having a highly uniform planar distribution. In the illuminating light rays, unevenness in the planar spatial luminance distribution is suppressed. Therefore, a high-image-quality liquid crystal display apparatus 700 with suppressed display unevenness can be provided.

In the third embodiment, the lengths of the optical transmission portions 76a and 76b in the X-axis direction equal the optical distance X defined by the expressions (1) and (2). Accordingly, the planar laser light source units 77a and 77b having high uniformity can be formed. By making the optical distance longer than X defined by the expressions (1) and (2), uniformity of the planar spatial luminance distributions of the planar laser light source units 77a and 77b can be improved further.

Fourth Embodiment

Figure 11:
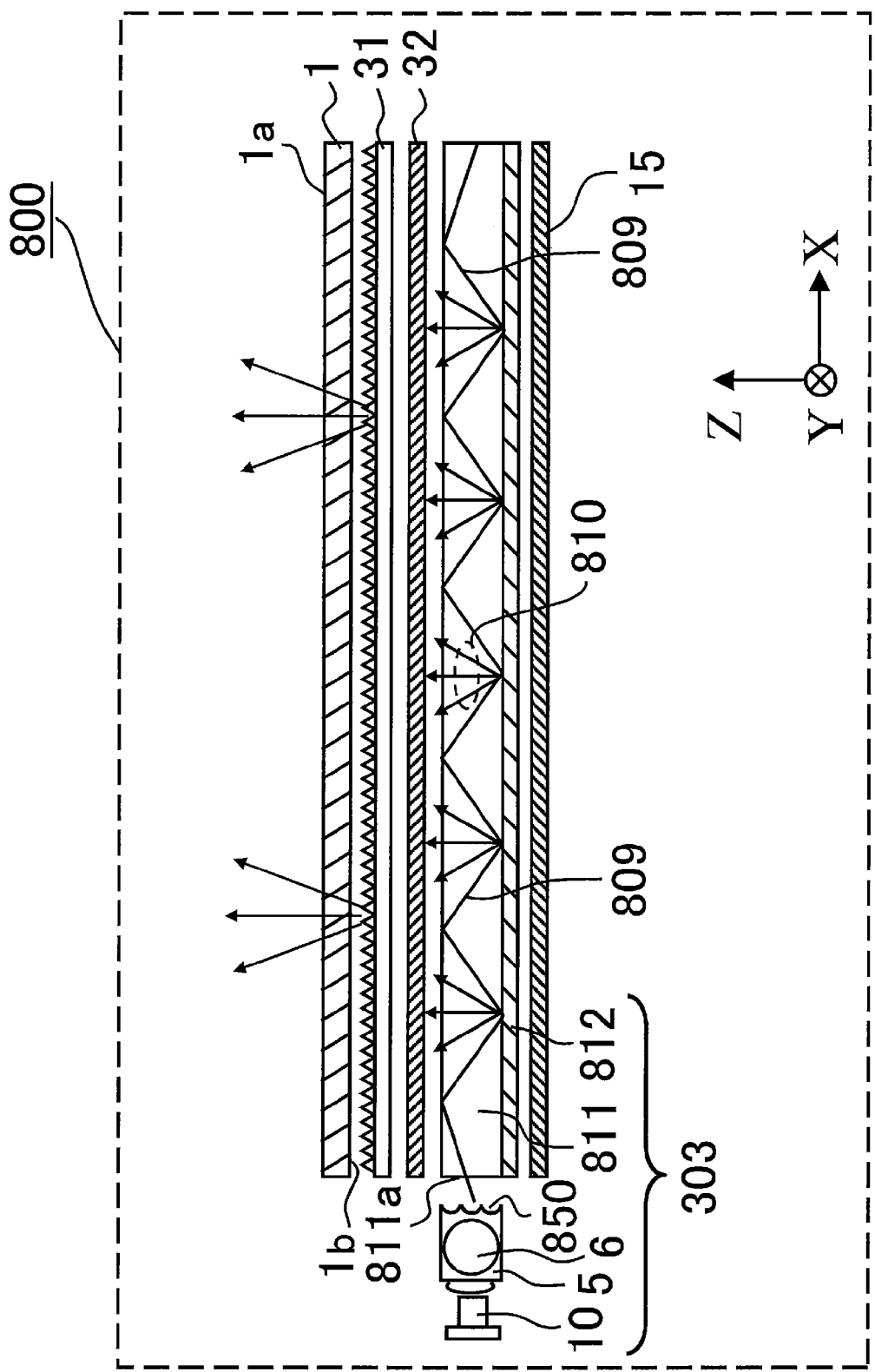
FIG. 11 is a diagram schematically showing structure of a liquid crystal display apparatus in a fourth embodiment.

FIG. 11 is a diagram schematically showing structure of a liquid crystal display apparatus 800, which is a transmission-type display apparatus, according to a fourth embodiment of the present invention. For ease of understanding, let a short side direction of a liquid crystal display element 1 be a Y-axis direction, a long side direction of the liquid crystal display element 1 (direction orthogonal to a Y-axis) be an X-axis direction, and a direction perpendicular to an X-Y plane be a Z-axis direction. In addition, let a side of a display surface 1a of the liquid crystal display element 1 be a positive Z-axis direction, an upper direction of the liquid crystal display apparatus (an upper direction when the liquid crystal display apparatus 800 is placed so that its screen faces in a horizontal direction) be a positive Y-axis direction, and a light output direction of a second light source 10, which will be described later, be a positive X-axis direction.

As shown in FIG. 11, the liquid crystal display apparatus 800 includes the transmission-type liquid crystal display element 1, an optical sheet 31, an optical sheet 32, a backlight device 303, and a light reflection sheet 15. The components 1, 31, 32, 303 and 15 are laid on top of one another in the Z-axis direction. The liquid crystal display element 1 has the display surface 1a parallel to the X-Y plane including the X-axis and Y-axis. The optical sheet 31 is a first optical sheet. The optical sheet 32 is a second optical sheet.

Figure 12:
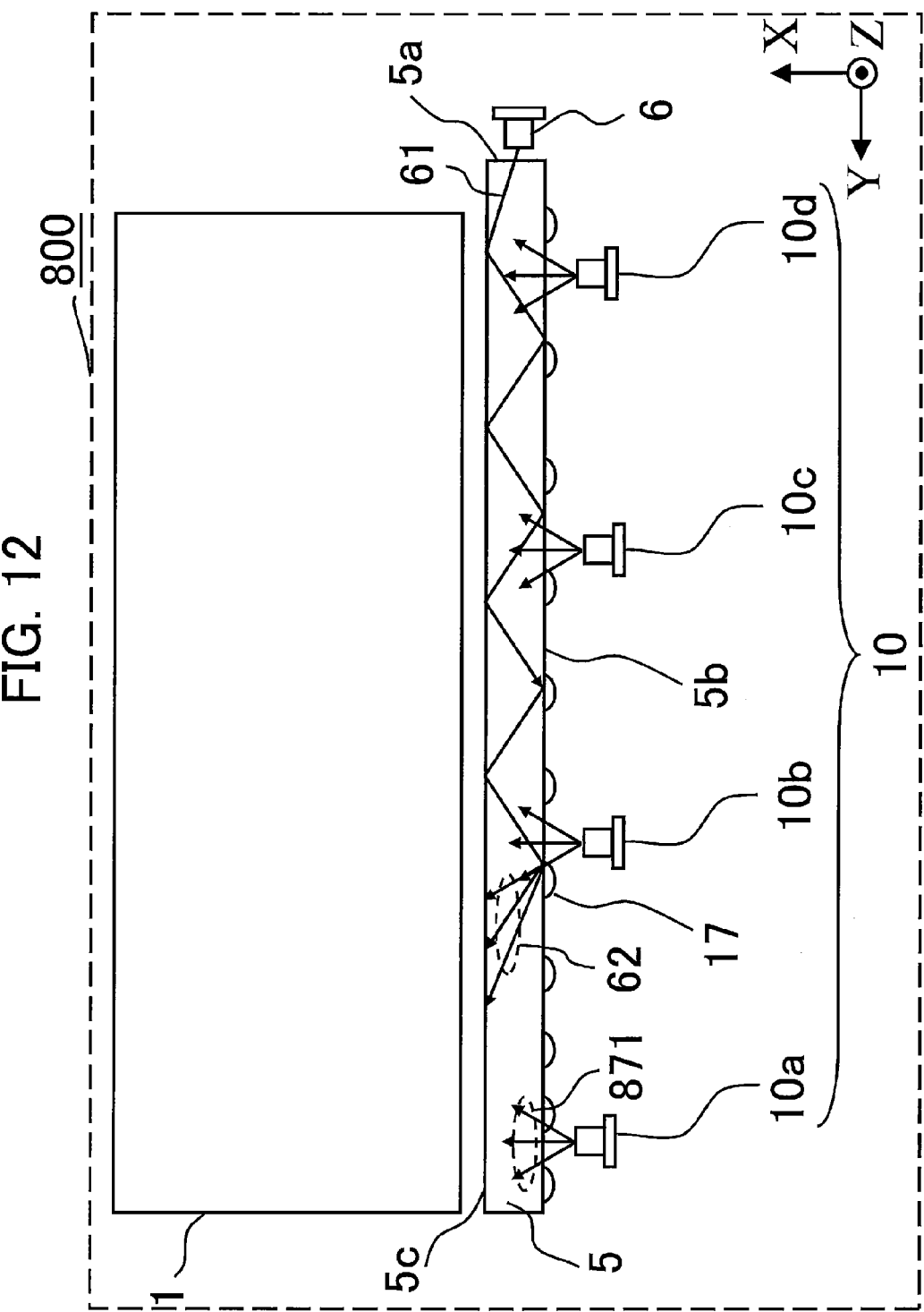
FIG. 12 is a diagram schematically showing structure of the liquid crystal display apparatus in the fourth embodiment.

FIG. 12 shows the liquid crystal display apparatus 800 shown in FIG. 11, viewed in a negative Z-axis direction. As shown in FIGS. 11 and 12, the backlight device 303 includes a light guide plate 811, an optical diffuse reflective portion 812, a light guide element 5, a light source 6, and the light source 10. The light source 6 is a first light source, and the light source 10 is a second light source.

The light guide plate 811 and the optical diffuse reflective portion 812 form a second spatial luminance distribution conversion portion which converts a light ray having a linear spatial luminance distribution to a light ray having a planar spatial luminance distribution and exits the light ray having the planar spatial luminance distribution toward the liquid crystal display element 1. The optical diffuse reflective portion 812 is disposed in contact with a face in the negative Z-axis direction of the light guide plate 811. The light guide element 5 has the function of converting a punctate spatial luminance distribution to a linear spatial luminance distribution. The light guide element 5 constitutes a first spatial luminance distribution conversion portion. The light guide element 5 is shaped almost like a rectangular prism and is disposed so that one longitudinal face having a longer side as its side face faces a side face of the guide plate 811. That is, one long side of the light guide element 5 is put in the Y-axis direction, and two short sides of the light guide element 5 are put in the X-axis direction and the negative Z-axis direction. One short side of the light guide element 5 is parallel with the X-axis, and another short side of the light guide element 5 is parallel to the Z-axis. A face of the light guide element 5 facing the face of the light guide plate 811 is a light output face 5c of the light guide element 5. The face of the light guide plate 811 facing the face of the light guide element 5 is a light incidence face 811a of the light guide plate 811. The light output face 5c of the light guide element 5 is configured to have a smaller thickness in the negative Z-axis direction than the light incidence face 811a. It is preferable that a central position of the light guide element 5 in a thickness direction (Z-axis direction) be aligned with a central position of the light guide plate 811 in a thickness direction (Z-axis direction). In the light output face 5c of the light guide element 5, microscopic concave optical elements 850 having a curvature just in an X-Z section are formed. The microscopic optical element 850 is a cylindrical face having its central axis in the Y-axis direction, having a curvature (curve) in the X-Z section, not having a curvature (linear) in the orthogonal direction (Y-axis direction). The light output face 5c of the light guide element 5 has a plurality of microscopic optical elements 850 arranged in the Z-axis direction. With the microscopic optical elements 850, a divergence angle in the X-Z plane of a light ray 61 emitted from the light output face 5c of the light guide element 5 toward the light guide plate 811 can be increased.

The light source 6 emits the red light ray 61. The light ray 61 enters the light guide element 5 from a light incidence face 5a formed by the short sides and travels in the positive Y-axis direction in the light guide element 5. A light ray 871 emitted from the light source 10 travels in the positive X-axis direction and enters the light guide element 5 from a light incidence face 5b. The light incidence face 5b is a face facing the light output face 5c of the light guide element 5 that faces the light guide plate 811. The light source 10 has a plurality of light emitting elements 10a, 10b, 10c, and 10d disposed in the Y-axis direction to face the light incidence face 5b. The light source 6 is a light emitting element having a small divergence angle and a high directionality, like the laser light source, for example. The light source 10 is formed by a plurality of light emitting elements having a large divergence angle. In other words, the light source 6 is a laser light source like the light sources 20a and 20b in the first embodiment, for example. Like the light source 10 in the first embodiment, the light source 10 is an LED light source as a plurality of light emitting elements. The light incidence face 5a is a first light incidence face, and the light incidence face 5b is a second light incidence face. The light ray 61 is a first light ray, and the light ray 871 is a second light ray.

Figure 13:
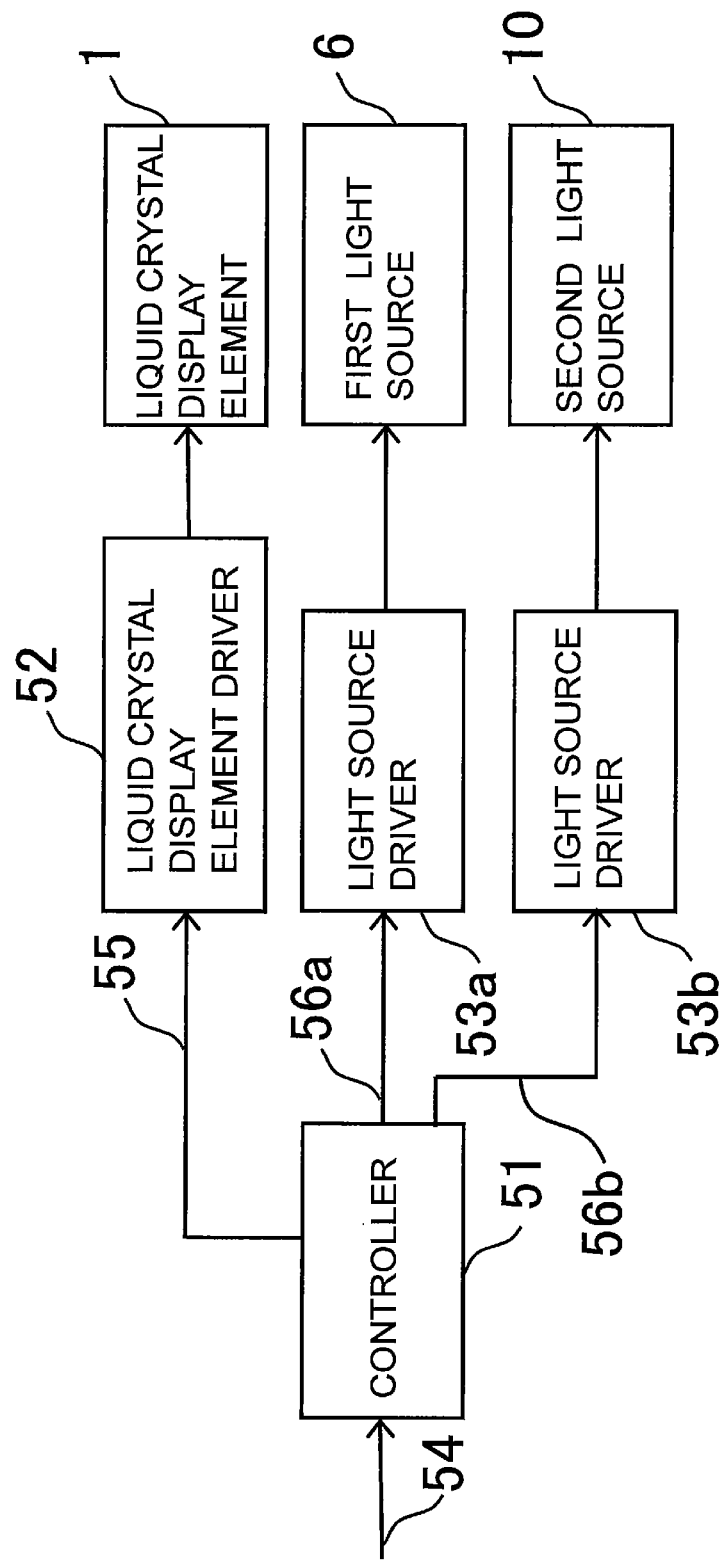
FIG. 13 is a block diagram showing a configuration of the liquid crystal display apparatus in the fourth embodiment.

Similarly to the first embodiment, the liquid crystal display apparatus 800 includes a controller 51, a liquid crystal display element driver 52, and light source drivers 53a and 53b. FIG. 13 is a schematic block diagram showing a configuration of the liquid crystal display apparatus 800. The operation of the liquid crystal display apparatus 800 will be described with reference to FIG. 13. The liquid crystal display apparatus 800 includes the liquid crystal display element driver 52 for driving the liquid crystal display element 1, the light source driver 53a for driving the light source 6, and the light source driver 53b for driving the plurality of light sources 10. The operation of the liquid crystal display element driver 52 and the light source drivers 53a and 53b is controlled by the controller 51.

The controller 51 performs image processing on video signals 54 supplied from a signal source, which is not illustrated, and generates control signals and supplies these control signals to the liquid crystal display element driver 52 and the light source drivers 53a and 53b. A liquid crystal display element control signal 55 is a control signal sent from the controller 51 to the liquid crystal display element driver 52. A light source control signal 56a is a control signal sent from the controller 51 to the light source driver 53a. A light source control signal 56b is a control signal sent from the controller 51 to the light source driver 53b. The light source drivers 53a and 53b control the light sources 6 and 10 respectively in accordance with the light source control signals 56a and 56b from the controller 51 and have the light sources 6 and 10 emit light rays.

Figure 14:
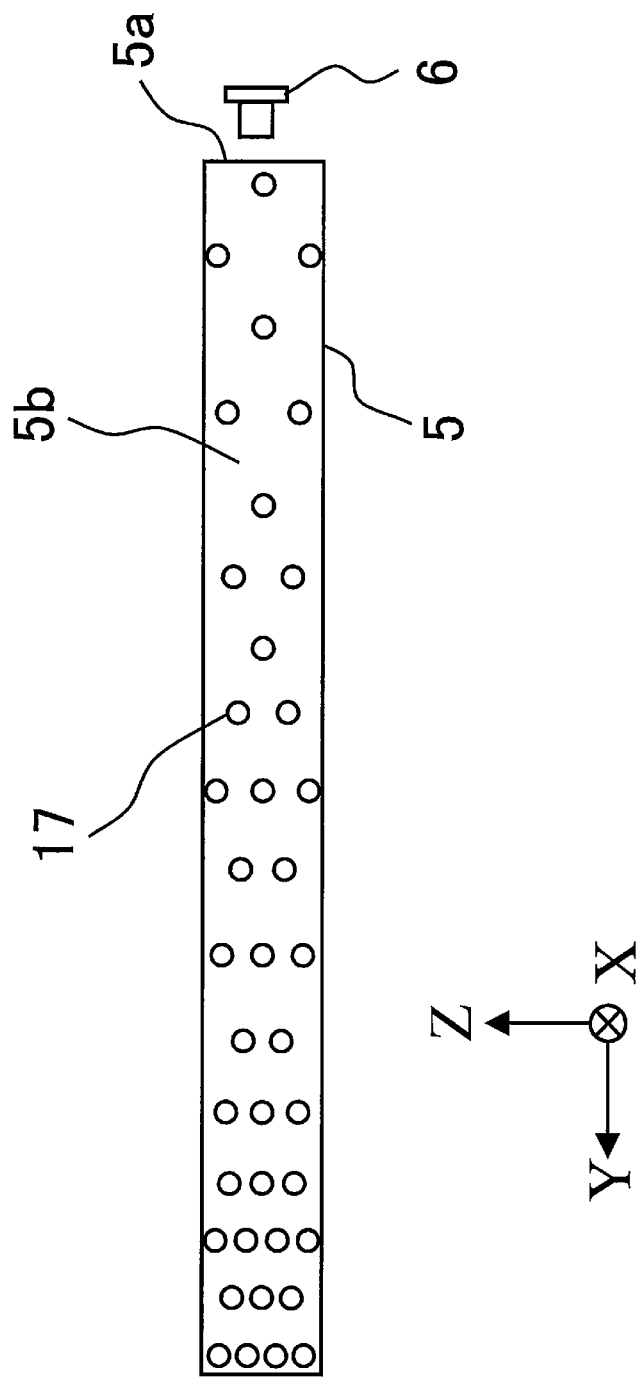
FIG. 14 is a diagram schematically showing structure of a light guide element in the fourth embodiment.
Figure 15:
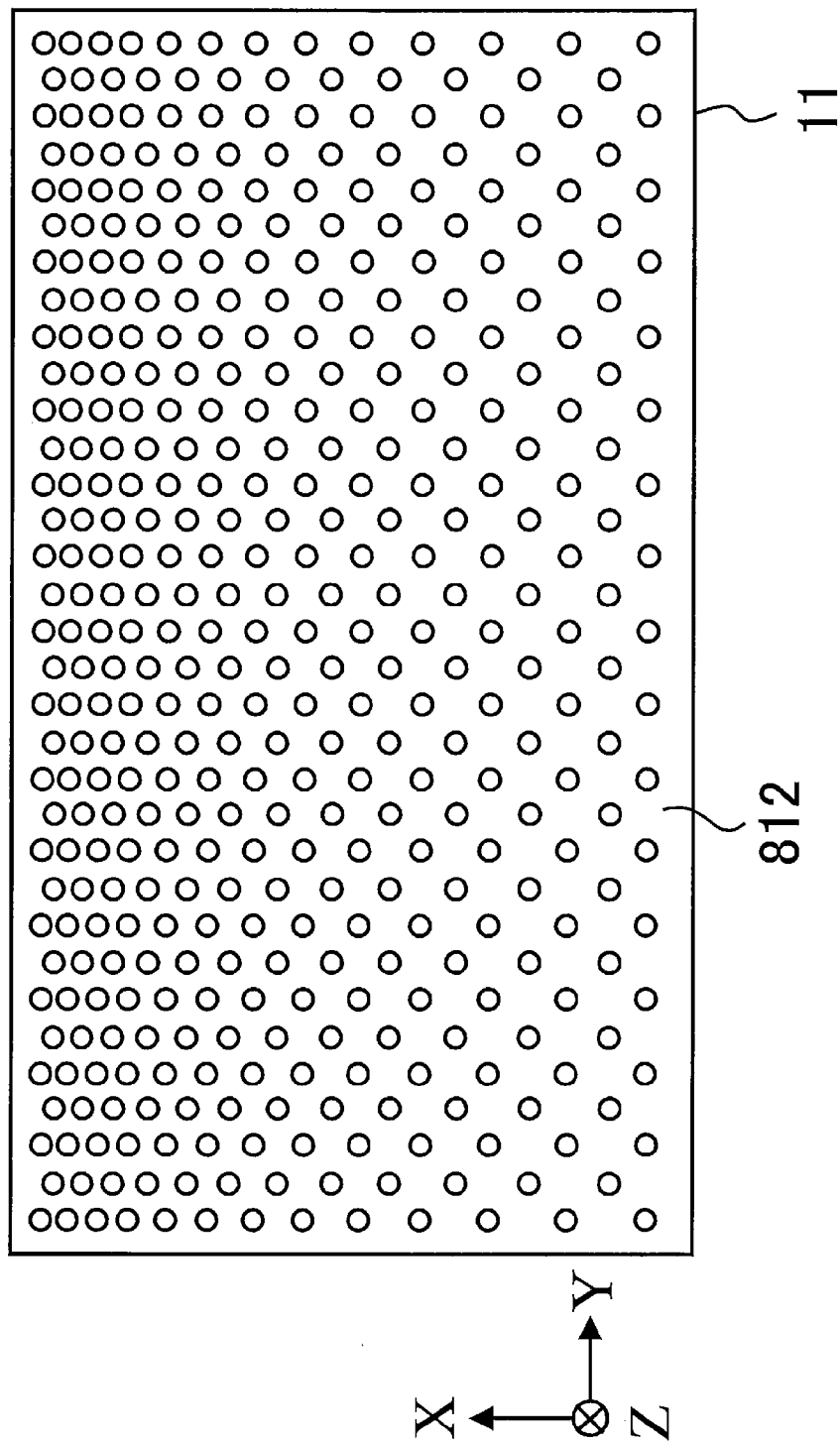
FIG. 15 is a diagram schematically showing a disposition of microscopic optical elements provided on a light guide plate in the fourth embodiment.

FIG. 14 is a diagram schematically showing structure of the light guide element 5 in the fourth embodiment. FIG. 14 shows the light guide element 5 viewed in a negative X-axis direction. In other words, FIG. 14 shows the side of the light incidence face 5b of the light guide element 5. The light incidence face 5b of the light guide element 5 is the opposite face of the light output face 5c facing the light guide plate 811. In the fourth embodiment, the light guide element 5 is formed by a transparent material and is a member like a square bar. In the fourth embodiment, the light guide element 5 includes a plurality of microscopic optical elements 17, which are optical elements, in the light incidence face 5b. The light ray 61 emitted from the light source 6 enters the light guide element 5 from the light incidence face 5a and travels in the light guide element 5 by total reflection. The light rays 871 emitted from the plurality of light emitting elements (such as 10a to 10d) constituting the light source 10 enter the light guide element 5 from the light incidence face 5b. The light rays 871 disperse when they pass through the microscopic optical elements 17. The light rays 871 are mixed with the incident light ray 61 coming from the light source 6 in the light guide element 5.

Then, the light rays 871 are discharged from the light output face 5$c$ of the light guide element 5 toward the light guide plate 811.

As described above, like a laser light source, the light source 6 is a light source having a small divergence angle and high directionality. In order to generate a light ray having a linear spatial luminance distribution from the light source with high directionality, the light ray 61, which is a laser light ray, is directed into the light guide element 5 through the light incidence face 5$a$ having a small sectional area. The light incidence face 5$a$ is a face (face parallel to the X-Z plane in FIG. 12) perpendicular to the light traveling direction (Y-axis direction in FIG. 12) of the light ray 61. Accordingly, the number of times of reflection in the light guide element 5 can be increased even for a laser light ray having high directionality and a small divergence angle. By using the microscopic optical elements 17 to take a given amount of the reflected light at a time and to emit it from the light output face 5$c$, light having a linear spatial luminance distribution (light having a linear shape in a cross section perpendicular to the light traveling direction) can be generated easily. Here, since an optical distance of the light ray 61 up to first incidence on the microscopic optical element 17 is short, the light guide element 5 can minimize unnecessary space. Therefore, the backlight device 303 can be downsized.

The light guide plate 811 is disposed parallel to the display surface 1$a$ of the liquid crystal display element 1. The light guide plate 811 includes the optical diffuse reflective portion 812 in its back surface. The back surface of the light guide plate 811 is on the opposite side of the liquid crystal display element 1 of the light guide plate 811 and is a face on the side in the negative Z-axis direction. The light guide element 5 is disposed so as to face the light incidence face 811$a$. The light incidence face 811$a$ is an end face of the light guide plate 811 in the negative X-axis direction. A light ray 809 output from the light guide element 5 travels from the light incidence face 811$a$ of the light guide plate 811 toward a center of the light guide plate 811. The light ray 809 is a mixture of an illuminating light ray 62 and the light ray 871.

The light ray 809 output from the light guide element 5 travels inside the light guide plate 811 by total reflection. Part of the light ray 809 is diffused and reflected by the optical diffuse reflective portion 812 disposed on a back surface side. The back surface side is on the side in the negative Z-axis direction. The diffused light is output from a front surface of the light guide plate 811 as an illuminating light ray 810. The front surface of the light guide plate 811 is a face of the light guide plate 811 on the side of the liquid crystal display element 1 and is a face on the side in the positive Z-axis direction. The illuminating light ray 810 output from the light guide plate 811 passes through the optical sheet 32 and the optical sheet 31 and illuminates the liquid crystal display element 1.

The optical sheet 31 has the function of directing the illuminating light ray 810 output from the backlight device 303 into a normal direction of the display surface 1$a$ of the liquid crystal display element 800. The optical sheet 32 has the function of suppressing optical effects such as slight unevenness in illumination.

The light reflection sheet 15 is disposed in the negative Z-axis direction of the backlight device 303. The light ray output from the backlight device 303 to a back surface side is reflected by the light reflection sheet 15 and is used as an illuminating light ray for illuminating a back surface 1$b$ of the liquid crystal display element 1. The back surface side is on the side in the negative Z-axis direction. As the light reflection sheet 15, a light reflection sheet based on plastic such as polyethylene terephthalate can be used, for example. As the light reflection sheet 15, a different type of light reflection sheet such as a light reflection sheet made by depositing metal on a surface of a substrate may be used, for example.

The liquid crystal display element 1 includes a liquid crystal layer parallel to the X-Y plane orthogonal to the Z-axis direction. The display surface 1$a$ of the liquid crystal display element 1 has a rectangular shape. The X-axis direction and the Y-axis direction shown in FIG. 11 are directions along two orthogonal sides of the display surface 1$a$. The liquid crystal display element driver 52 varies the optical transmittance of the liquid crystal layer in units of pixels in accordance with the liquid crystal control signal 55 supplied from the controller 51. Each pixel has three sub-pixels, and each sub-pixel has a color filter that passes red light, green light, or blue light only. The liquid crystal display element driver 52 generates a color image by controlling the transmittance of each sub-pixel. Accordingly, the liquid crystal display element 1 generates image light by modulating illuminating light rays entering from the backlight device 303 spatially. The liquid crystal display element 1 can output the image light from the display surface 1$a$. The liquid crystal display element 1 has color filters of three primary colors of light, red, green, and blue, a color other than the three primary colors of light can be added to expand a color reproduction range.

The components in the fourth embodiment will be described in detail. The light source 6 is a laser light source having a highly monochromatic spectrum with a peak at 640 nm and a half-width-at-half-maximum spectral width of 1 mm. A half-width-at-half-maximum divergence angle of the light source 6 is 40 degrees in a fast-axis direction and is 10 degrees in a slow-axis direction. In the fourth embodiment, the laser light emitting elements included in the light source 6 are disposed so that the fast-axis direction with a greater half-width-at-half-maximum is reflected by the light incidence end face 5$b$ and the light output end face 5$c$ of the light guide element 5. That is, the fast-axis direction of the laser light emitting element is the X-axis direction in FIG. 11. The short side of the light incidence face 811$a$ is a side parallel to the Z-axis. The light source 6 is a first light source.

In other words, light rays in the fast-axis direction with a large divergence angle of the light rays 61 of the laser light emitting element are reflected between the light incidence face 5$b$ and the light output face 5$c$ of the light guide element 5. This configuration increases the number of reflections of the laser light ray in the light guide element 5, thereby increasing the light rays 61 entering the microscopic optical elements 17 provided in the light guide element 5. As a result, with this configuration, a light ray extraction efficiency F by the microscopic optical elements 17 can be improved. Here, $$F=\text{(amount of light output from light guide element to light guide plate)/(amount of light traveling in light guide element)}$$

The light guide element 5 is a 2-mm-by-2-mm bar-like member formed by a transparent material such as an acrylic plastic (PMMA). As shown in FIGS. 12 and 14, the microscopic optical elements 17 having a convex hemispherical shape (hereafter referred to as a convex lens shape) for emitting light rays 61 traveling in the light guide element 5 into a direction of the light output face 5$c$ (positive X-axis direction) are formed in the light incidence face 5$b$ (face on the opposite side of the light guide plate 811).

The light ray 61 entering the light guide element 5 from the light incidence face 5$a$ travels in the Y-axis direction in the light guide element 5 by repeating reflection, by total reflection at the interface between air and the light guide element 5. The light rays 61 entering the microscopic optical elements 17 change their traveling directions on the curved faces, and some of them fail to satisfy the conditions of total reflection at the interface between air and the light output face 5c (face on the side of the light guide plate 811) of the light guide element 5. The light rays 61 that fail to satisfy the conditions of total reflection are output as the illuminating light rays 62 from the light output face 5c of the light guide element 5 toward the light incidence face 811a of the light guide plate 811.

A disposition density is a proportion of an area occupied by the microscopic optical elements 17 per unit area. The disposition density can be adjusted by changing the number of microscopic optical elements 17 in the unit area. The disposition density can also be adjusted by changing the size of the microscopic optical elements 17 per unit area (area of a single microscopic optical element). Accordingly, a spatial luminance distribution in the Y-axis direction of the illuminating light ray 62 output from the light guide element 5 can be controlled.

For example, a microscopic optical element 17 having a convex lens shape with a surface curvature of approximately 0.15 mm, the maximum height of approximately 0.005 mm, and a refractive index of approximately 1.49 can be used as a specific example of the microscopic optical element 17. A material of the light guide element 5 and the microscopic optical elements 17 can be an acrylic plastic. However, the material of the light guide element 5 and the microscopic optical elements 17 is not limited to an acrylic plastic. As the material of the light guide element 5 and the microscopic optical elements 17, any plastic material that has a high optical transmittance and a high forming ability, such as a polycarbonate plastic, may be used instead of an acrylic plastic. As the material of the light guide element 5 and the microscopic optical elements 17, a glass material may be used instead of an acrylic plastic.

The light guide element 5 is structured to vary the disposition density of the microscopic optical elements 17 with respect to the position in the traveling direction (positive Y-axis direction in FIG. 12) of the light ray 61. The microscopic optical elements 17 are provided on the light incidence face 5b of the light guide element 5. The area on the light incidence face 5b ranges from the vicinity of the light incidence face 5a in the light guide element 5 to the position of the end face facing the light incidence face 5a. The disposition density of the microscopic optical elements 17 vary continuously from low to high from the light incidence face 5a. That is, the disposition density of the microscopic optical elements 17 vary gradually or continuously from low to high from the light incidence face 5a toward the end face facing the light incidence face 5a.

The light ray 61 entering the light guide element 5 from the light incidence face 5a is gradually emitted toward the light guide plate 811 by the microscopic optical elements 17. As the light ray 61 travels in the Y-axis direction, the amount of light in the light guide element 5 decreases. However, the disposition density of the microscopic optical elements 17 increases in the Y-axis direction, as shown in FIG. 14. This increases a proportion of the amount of light entering the microscopic optical elements 17 with respect to the amount of light of the light ray 61 traveling in the light guide element 5. As a result, the illuminating light rays 62 output from the light output face 5c of the light guide element 5 toward the light guide plate 811 become light having a uniform spatial luminance distribution in the Y-axis direction and having a linear shape in a cross section perpendicular to the light traveling direction (a light ray similar to a light ray emitted from a linear light source). The light output face 5c is a face facing the light guide plate 811.

The illuminating light rays 62 output from the microscopic optical elements 17 have a small divergence angle in the slow-axis direction. The slow-axis direction is in the Z-axis direction. Since the light rays 61 with a small divergence angle, emitted from the light source 6, travels in the light guide element 5 by repeating reflection, the divergence angle given at the output from the light source 6 is maintained. Light entering the microscopic optical elements 17 changes its traveling direction, but the divergence angle changes little. When the illuminating light rays 62 with a small divergence angle enter the light guide plate 811, a proportion of light entering the optical diffuse reflective portion 812 provided in the back surface of the light guide plate 811 decreases. This lowers the light ray extraction efficiency of the light guide plate 811 with respect to the illuminating light rays 62. In addition, the positions of incidence of the illuminating light rays 62 in the optical diffuse reflective portion 812 become spatially uneven. This results in an uneven spatial luminance distribution of light output from the light guide plate 811 in the X-Y plane. In the fourth embodiment, the plurality of light sources 6 and 10 use the same light guide plate 811. Since light rays entering the light guide plate 811 have almost the same characteristics, unevenness in color can be suppressed. In other words, it is preferable that the illuminating light rays 62 have a wide divergence angle.

In the fourth embodiment, the illuminating light rays 62 output from the light guide element 5 pass through the microscopic optical elements 850 provided in the light output face 5c of the light guide element 5. This increases the divergence angle of the illuminating light rays 62 in the thickness direction of the light guide plate 811 (slow-axis direction). The illuminating light rays 62 with the increased divergence angle are output from the light output face 5c toward the light incidence face 811a of the light guide plate 811. The microscopic optical elements 850 have a curvature in the X-Z plane and increases the divergence angle of the illuminating light rays 62 in the X-Z plane. This improves the light ray extraction efficiency of the light guide plate 811 with respect to the illuminating light rays 62. Consequently, the luminance of the backlight device 303 can be improved. In addition, power consumption can be lowered. The problem of uniforming a planar spatial luminance distribution of the illuminating light rays 810 output from the light guide plate 811 to the liquid crystal display element 1 can be solved. The problem of unevenness in color generated by mixing the colors of light from the light source 6 and light from the light source 10 can be solved.

The microscopic optical elements 850 in the fourth embodiment have a curvature just in the X-Z plane, and a plurality of them are arranged in the Z-axis direction. However, the present invention is not confined to that. If the following two requirements are met, the microscopic optical elements 850 may have another structure. A first requirement is that the divergence angle of light output from the microscopic optical elements 17 becomes large. The first requirement is equivalent to that an incident angle of light entering the light guide plate 811 becomes large. A second requirement is that the light ray is converted to an angular luminance distribution symmetrical about the traveling direction (X-axis direction) of the illuminating light rays 62 traveling in the light guide plate 811 in the thickness direction of the light guide plate 811 (Z-axis direction). For example, in the X-Z section of the light guide element 5, a plurality of triangular prisms having a slant face may be arranged in the Z-axis direction. The structure is not limited to the arrangement of the microscopic optical elements (such as the microscopic optical elements 850) in the one-dimensional direction (Z-axis direction), and the structure may include the arrangement of the microscopic optical elements in two-dimensional directions (Z-axis direction and Y-axis direction). However, since the effect of broadening the illuminating light rays 62 in the direction of thickness of the light guide plate 811 is dominant, the arrangement of the microscopic optical elements just in the one-dimensional direction (Z-axis direction) is simpler and takes effect more efficiently.

In the fourth embodiment, the microscopic optical elements 850 are provided in the light output face 5c. The present invention is not confined to that. The microscopic optical elements 850 are provided to increase the divergence angle of the light rays 61 emitted from the light source 6, so that they may be provided in another face that the light rays 61 or illuminating light rays 62 pass through before they enter the light guide plate 811. In the fourth embodiment, the microscopic optical elements 850 may be provided in the light incidence face 5a of the light guide element 5 or in the light incidence face 811a of the light guide plate 811, for example.

The light source 10 emits green and blue (hereinafter referred to as cyan) light rays 871 because white color is created by mixing red illuminating light rays 62 emitted from the light source 6. More specifically, the light emitting elements 10a, 10b, 10c, and 10d constituting the light source 10 are a package including a monochromatic blue LED, filled with a green fluorescent substance for absorbing blue light and emitting green light. The light source 10 includes a close arrangement of a plurality of cyan LEDs in the Y-axis direction. The light emitting elements 10a, 10b, 10c, and 10d including the cyan LEDs have a peak around 450 nm and around 530 nm. The light emitting elements 10a, 10b, 10c, and 10d emit cyan light rays 871 having a continuous spectrum in the band of 420 nm to 580 nm. As light emitting elements constituting the light source 10, a light source for emitting cyan light by a combination of an excitation light source and s fluorescent substance can be used. In the light emitting elements constituting the light source 10, in addition to the configuration in which a green fluorescent substance is excited by blue light to emit cyan light, a configuration in which blue and green fluorescent substances are excited by ultraviolet light to emit cyan light can also be used. As the light emitting elements constituting the light source 10, a fluorescent lamp can be used as well as the LED described above. The light source 6 is the first light source, and the light source 10 is the second light source.

The LED light source used as the light source 10 in the fourth embodiment has a wide divergence angle. So, as with the light source 10 in the fourth embodiment, the light rays 871 emitted from a plurality of light sources in the one-dimensional (Y-axis direction) arrangement spatially overlap the light ray 871 emitted from an adjacent light source because of their own divergence angle when they pass through the light guide element 5. Further, since the microscopic optical elements 17 provided in the light guide element 5 have a curvature, the light rays 871 entering the microscopic optical elements 17 are spatially uniformed by optical diffusion.

When a plurality of light rays emitted from nearby light sources are spatially overlapped, their distributions are averaged to a spatial luminance distribution equalized in the direction of arrangement of the light sources. Even if a single light ray has an uneven spatial luminance distribution, by overlapping a plurality of light rays, their distributions can be averaged, and light having a uniform spatial luminance distribution in the direction of arrangement of the light sources and having a linear shape in a cross section perpendicular to the light traveling direction (a light ray similar to a light ray emitted from a linear light source) can be created.

The light guide element 5 is disposed so as to face the light incidence face 811a of the light guide plate 811. The red illuminating light rays 62 emitted from the light source 6 and the cyan light rays 871 emitted from the light source 10 are separately output from the light output face 5c of the light guide element 5 toward the light guide plate 811, as light having a linear shape in a cross section perpendicular to the light traveling direction (a light ray similar to a light ray emitted from a linear light source). Accordingly, the controller 51 controls the light source drivers 53a and 53b separately (light source control signals 56a and 56b) to adjust a ratio of luminance of the red illuminating light rays 62 emitted from the light source 6 to luminance of the cyan light rays 871 emitted from the light source 10. Then, the light guide element 5 functions as a white linear light source. The light incidence face 811a is a face of the light guide plate 811 in the X-axis direction.

In the fourth embodiment, the light guide element 5 is a square bar-like member having a 2-mm-by-2-mm end face. The present invention is not confined to that. The thickness of the light guide element 5 in the Z-axis direction should be smaller than the thickness of the light guide plate 811 at least in terms of optical coupling efficiency with the light guide plate 811. Use of a light guide element 5 with a small thickness in the X-axis direction is preferable in terms of making the liquid crystal display thinner and lighter and improving usage efficiency of the light ray (light ray 61) by increasing the number of reflections. Since the laser light source is a light source having a small area of light emitting face and a high directionality, high optical coupling efficiency can be provided with a thin light guide element 5. However, decrease in rigidity resulting from the decreased thickness of the light guide element 5 should also be considered.

The light guide plate 811 is formed by a transparent material. The light guide plate 811 is a plate-like member having a thickness of 4 mm. The light guide plate 811 includes the optical diffuse reflective portion 812 for outputting the illuminating light rays 62 and the light rays 871 output from the light guide element 5 toward the back surface 1b of the liquid crystal display element 1, in its back surface. The optical diffuse reflective portion 812 can be configured by printing spots of a diffuse reflective material such as white ink on the back surface of the light guide plate 811, for example. A density of printed spots of the optical diffuse reflective material is varied so that the density is low in the vicinity of the light incidence face 811a of the light guide element 5 and the density increases as a distance from the light guide element 5 increases. Accordingly, it becomes possible to make a uniform spatial luminance distribution of the illuminating light rays 810 in the X-Y plane.

The illuminating light rays 810 output from the light guide plate 811 toward the liquid crystal display element 1 are occasionally reflected in the negative Z-axis direction by a later component such as the optical sheet 31 or 32, for example. To improve luminance and to lower power consumption, those rays must be used again as the illuminating light rays of the liquid crystal display element 1. For that purpose, the backlight device 303 includes the light reflection sheet 15 in the negative Z-axis direction.

As the optical diffuse reflective portion 812 of the light guide plate 811 in the fourth embodiment, spots printed to reflect the light rays have been described as a specific example. The same effects as obtained by the diffuse reflective structure can be obtained by refractive reflection structures such as convex and concave shapes of a lens or a corrugated shape. Therefore, the optical diffuse reflective portion 812 includes refractive reflection structures as well as the diffuse reflective structure.

In the fourth embodiment, a laser light source is used as the light source 6, but the present invention is not confined to that. The present invention is also effective for any light source which has a small light emitting area, has a divergence angle, and outputs a large amount of light per unit light emitting area, like the laser light source. For example, by using a monochromatic LED light source which outputs a large amount of light per unit area as the light source 6, light having a uniform spatial luminance distribution and having a linear shape in a cross section perpendicular to the light traveling direction (a light ray similar to a light ray emitted from a linear light source) can be obtained by a compact configuration. On the other hand, the light source 10 is a light source which has a wide divergence angle and outputs a smaller amount of light per unit area than the light source 6. In the fourth embodiment, a planar light source without unevenness in color can be created by using both the light source 6 and the light source 10 having different characteristics as described above.

The liquid crystal display apparatus 800 in the fourth embodiment includes a red laser and a cyan LED. The cyan LED includes a monochromatic blue LED and a green fluorescent substance which absorbs blue light and emits green light. By using a highly monochromatic laser as the light source of the backlight device, chromatic purity of display colors can be improved than by using a monochromatic LED or a multicolor LED. Accordingly, the liquid crystal display apparatus 800 utilizing a laser as its light source can display more vivid colors than a liquid crystal display apparatus using another light source. In comparison with the monochromatic LED, the laser has higher output. The laser has higher photoelectric conversion efficiency at an input of a high current. So, the liquid crystal display apparatus 800 can implement a small size, high power and low power consumption.

The liquid crystal display apparatus 800 of the fourth embodiment uses a red laser. The reasons are described below.

A first reason is that the white LED widely used in the existing backlight device has a small amount of optical energy in the red color range. Particularly, the proportion of light of 630 to 640 nm preferable as pure red in the red color range is very small. Therefore, if it is tried to improve the chromatic purity in this wavelength region, the amount of light transmitted by a filter decreases considerably, thereby lowering the luminance remarkably. This is because a spectral width of the filter included in the liquid crystal display element 1 is narrowed to improve the chromatic purity. The spectral width of light passing through the filter is narrowed, and the amount of light decreases.

A second reason is that humans are highly sensitive to a color difference in the red color. For example, a monochromatic red LED having a narrower wavelength bandwidth than a white LED has a wavelength bandwidth of several tens of nanometers. On the contrary, the wavelength bandwidth of the red laser is just several nanometers. A difference in wavelength bandwidth of the red color is perceived as a more conspicuous difference by human eyes. The difference in wavelength bandwidth means a difference in chromatic purity.

Therefore, replacing the red light among three primary colors with the laser produces a high effect in lowering power consumption and improving the chromatic purity. From this reason, the liquid crystal display apparatus 800 in the fourth embodiment uses a laser as the red light source.

When a white LED or a monochromatic red LED having a broad wavelength bandwidth is used conventionally, part of red light passes through a green filter having an adjacent spectrum, thereby lowering chromatic purity of green color as well. The white LED here has a continuous spectrum from blue to red. In the liquid crystal display apparatus 800 of the fourth embodiment, however, the increased chromatic purity of the red color decreases the amount of red light passing through the green filter. Accordingly, the liquid crystal display apparatus 800 can improve the chromatic purity of the green color.

In the liquid crystal display apparatus 800, blue light and green light are generated by the cyan LED including the monochromatic blue LED and the fluorescent substance which absorbs blue light and emits green light. For the green color, use of a monochromatic LED or a monochromatic laser for emitting green light may be possible. Simple and small LEDs and lasers that can be applied to a display are inferior to a multicolor LED using a fluorescent substance in terms of low power consumption and high power. So, the liquid crystal display apparatus 800 in the fourth embodiment uses a fluorescent substance for green light, instead of a light emitting element such as an LED or a laser, in order to simplify and downsize the device and to lower power consumption.

In the fourth embodiment, the monochromatic blue LED emits blue light and excites the green fluorescent substance. It is also effective to use a blue laser instead of the monochromatic blue LED for the purpose of broadening the color reproduction range. However, a blue light-emitting element is configured to excite a fluorescent substance to obtain a different color of light, similarly to the light source 10 of the fourth embodiment. In the configuration, the LED is preferable to the laser, as the blue light-emitting element. The reason is described below.

While the LED is driven by a low current and provides a low output, the laser is driven by a high current and provides high power. The driven laser generates a very large amount of heat. While light emitted from the LED has a wide divergence angle, light emitted from the laser has a very narrow divergence angle. With the laser, the density of intensity of excitation light incident to the fluorescent substance (intensity of incident light per unit area of fluorescent substance) becomes very high. Part of light absorbed by the fluorescent substance is converted to another wavelength and exited to the outside, and the remaining part of light is mainly converted to thermal energy. Generally, the internal conversion efficiency of the fluorescent substance (the amount of light converted to light having another wavelength with respect to the amount of absorbed light) ranges approximately from 40% to 80%. The thermal energy generated at the same time accounts for 20% to 60% of the energy of incident light. Accordingly, if a high-power laser light ray with a high density of intensity enters, the fluorescent substance generates a very large amount of heat.

The increased amount of heat generated by the laser including the fluorescent substance would raise the temperature of the fluorescent substance. The increased amount of heat generated by the fluorescent substance that absorbs blue light would also raise the temperature of the fluorescent substance. The increased temperature of the fluorescent substance would lower the internal conversion efficiency of the fluorescent substance significantly. Accordingly, the luminance would be lowered, and the power consumption would increase. Therefore, in the light source 10 in the fourth embodiment, it is preferable to use a cyan LED that includes a blue LED and a fluorescent substance which emits green light when excited by the blue light.

The liquid crystal display apparatus 800 in the fourth embodiment is configured to expand the color reproduction range efficiently with low power consumption, as described above. Among the light sources of the three primary colors, a laser is used only for the red color. A cyan LED is used for the blue color and green color. The cyan LED includes a monochromatic blue LED and a fluorescent substance that absorbs the blue light and emits green light. Accordingly, in comparison with conventional liquid crystal display apparatuses, a liquid crystal display apparatus that implements a wide color reproduction range with low power consumption can be provided by the simple and inexpensive configuration. The conventional liquid crystal display apparatuses include a liquid crystal display apparatus using a white LED, a liquid crystal display apparatus using monochromatic LEDs of the three primary colors, and a liquid crystal display apparatus using monochromatic lasers of the three primary colors.

Similarly to the liquid crystal display apparatus 800 of the fourth embodiment, by using a laser light source with high monochromaticity as a light source of the backlight unit, the chromatic purity of the display colors can be improved. As a result, a liquid crystal display apparatus that can display more vivid colors can be obtained, in comparison with the one using fluorescent lamps or LEDs, which are widely used conventionally, as light sources.

In the liquid crystal display apparatus 800 of the fourth embodiment, a monochromatic red laser light source is used as the light source 6, and a light source that emits a light ray of a mixed color of blue and green is used as the light source 10. As described above, the white LED using a yellow fluorescent substance has a small amount of energy especially for the emission spectrum in the red color range. Moreover, humans are highly sensitive to a color difference in the red color.

In the fourth embodiment, a red laser light source having a peak wavelength at 640 nm is used as the light source 6. However, the present invention is not confined to that. A laser light source which emits red light having a different wavelength may be used. Alternatively, a laser light source for emitting monochromatic visible light such as blue or green light may be used. It is also effective to use an LED which emits monochromatic light with a comparatively high monochromaticity, as the light source 6. In order to obtain a broader color reproduction region, use of a laser light source having the narrowest possible spectral width is preferable because it has a greater effect on expanding the color reproduction region. The laser light source having a narrow spectral width is a laser light source having a high monochromaticity. In the fourth embodiment, the light source 10 that emits a light ray of a complementary color is used, with respect to the light source 6 used as a monochromatic light source. That is, a combination of the light source 6 and the light source 10 generates white light. Here, the light source 6 is a first light source. The light source 10 is a second light source.

Generally, fluorescent lamps and LEDs can be used as the light source 6. However, if the chromatic purity is improved by narrowing the region of wavelengths that pass through the color filter included in the liquid crystal display element 1, loss of light by the color filter would increase, thereby lowering the luminance of the image. In the fourth embodiment, the chromatic purity is improved by increasing the monochromaticity of the light source 6, so loss of light by the color filter decreases. In other words, loss of image brightness can be suppressed. The liquid crystal display apparatus 800 can lower power consumption. The chromatic purity of the image can also be improved.

It may also be possible to use a monochromatic red LED as the light source 6. In comparison with the monochromatic LED light source, a laser light source has a higher monochromaticity. Accordingly, the display apparatus 800 can produce vivid images. The laser light source can be driven by low power. Because of its high directionality, coupling efficiency to the light guide element 5 can be improved. Therefore, the liquid crystal display apparatus 800 has an advantage of being able to lower power consumption. The liquid crystal display apparatus 800 also has an advantage of being able to improve the luminance.

According to the fourth embodiment, the controller 51 can adjust a proportion of luminance of the red illuminating light rays 62 emitted from the first light source 6 and luminance of the cyan light rays 871 emitted from the light source 10 by controlling the light source drivers 53a and 53b separately. Accordingly, the controller 51 can adjust the amount of light emission by each light source in accordance with a proportion of luminance of the corresponding color required by each video signal 54. By doing this, the liquid crystal display apparatus 800 can lower power consumption.

The backlight device 303 according to the fourth embodiment includes several types of light sources differing in divergence angle or the amount of light emission. In that case, with the simple and compact configuration in which the light guide element 5 is disposed in a face of the light guide plate 811, luminance distributions of light rays emitted from the light sources can be uniformed, and different types of light can be mixed efficiently. Accordingly, even if several types of light sources emit different colors of light, a liquid crystal display apparatus that can display a high-quality image with suppressed color unevenness can be provided. According to the fourth embodiment, since a laser and other monochromatic light sources can be used as the light sources, a liquid crystal display apparatus that can display vivid images with a wide color reproduction range can be provided.

In the fourth embodiment, the light guide element 5 is disposed in the long side direction of the light guide plate 811, or the Y-axis direction. However, the present invention is not confined to the configuration. By designing the optical diffuse reflective portion 812 to be disposed in the back surface of the light guide plate 811, the same effect can be obtained by disposition on the short side of the light guide plate 811.

Figure 16:
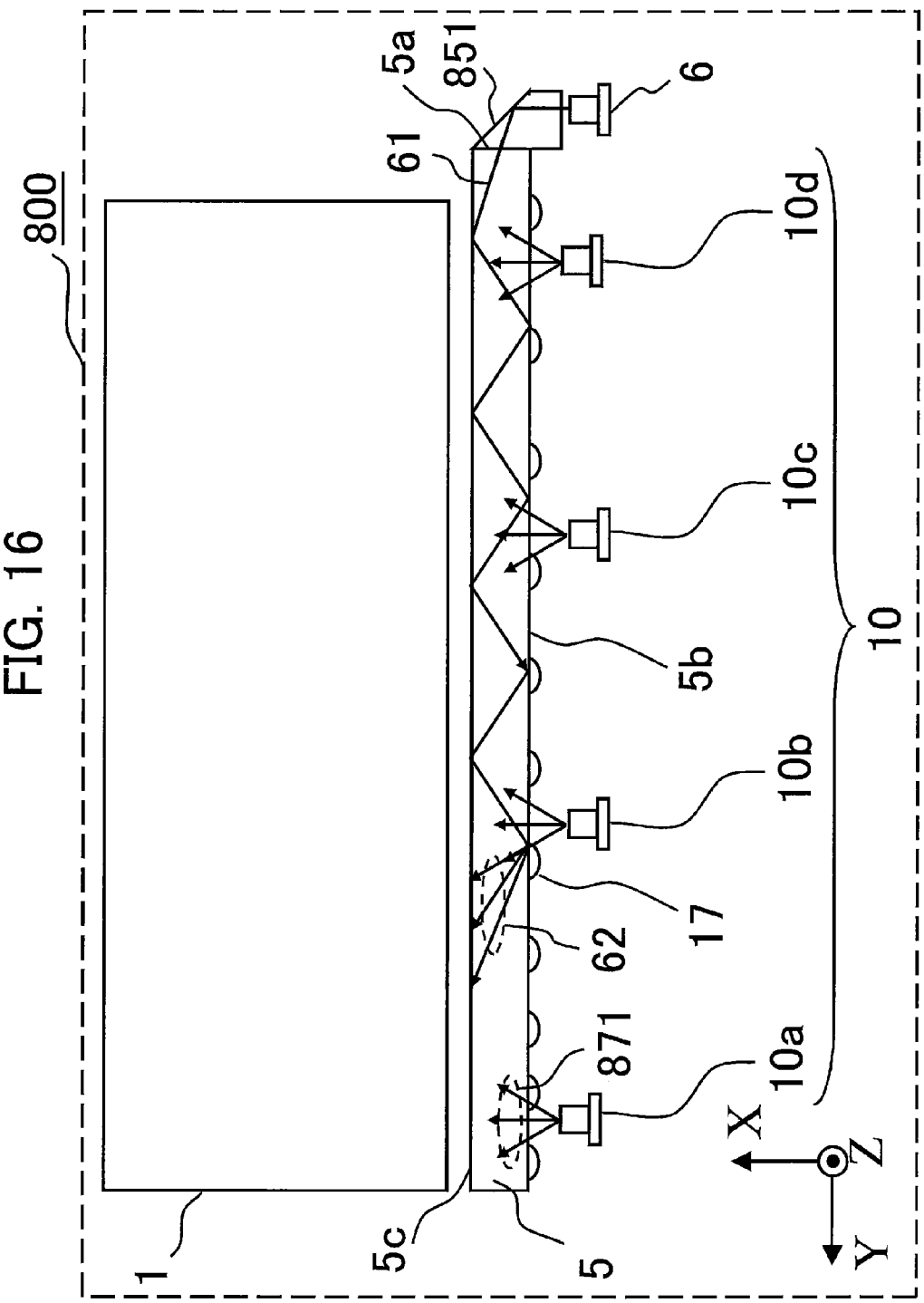
FIG. 16 is a diagram schematically showing an example of structure of the liquid crystal display apparatus in the fourth embodiment.

In the fourth embodiment, the light source 6 is disposed so as to emit the light rays 61 from the light incidence face 5a in the Y-axis direction. The light incidence face 5a is an end face having short sides of the light guide element 5. However, as shown in FIG. 16, the light source 6 and the light source 10 can be disposed side by side in the Y-axis direction. The light ray 61 emitted from the light source 6 in the positive X direction is guided onto the light incidence face 5a of the light guide element 5 by using an optical element having an effect of refracting light, such as a prism 851. The end face of the light guide element 5 may also be processed to form a reflecting face so that the traveling direction of the light ray 61 emitted from the light source 6 can be changed to the Y-axis direction.

In the fourth embodiment, the microscopic optical elements 17 have a convex lens shape. However, the present invention is not confined to the configuration. A different shape can be used if it includes structure that refracts the light ray 61 traveling in the Y-axis direction in the light guide element 5 into the X-axis direction and emits the light ray toward the light incidence face 811a of the light guide plate 811. For example, microscopic optical elements having a prism shape may be used, for example. Microscopic optical elements having a random uneven pattern may also be used.

The convex lens shape can refract the light ray with the transparent structure. The shape is simple in comparison with structures such as a prism. Therefore, the convex lens shape can be easily created. Since the convex lens shape can be created by printing, it can be created easily even if the light guide element 5 is long. With a random uneven shape formed by sandblasting and the like, the light ray can be refracted in the Z-axis direction. For the convex lens shape, the convex shape can be designed. Therefore, a uniform spatial luminance distribution as a linear light source can be easily designed.

According to the fourth embodiment, the laser light ray (light ray 61) travels in the light guide element 5 and the light guide plate 811 by multiple reflection. Therefore, speckle noise in conventional image display apparatuses using highly coherent laser light sources can be reduced.

Fifth Embodiment

Figure 17:
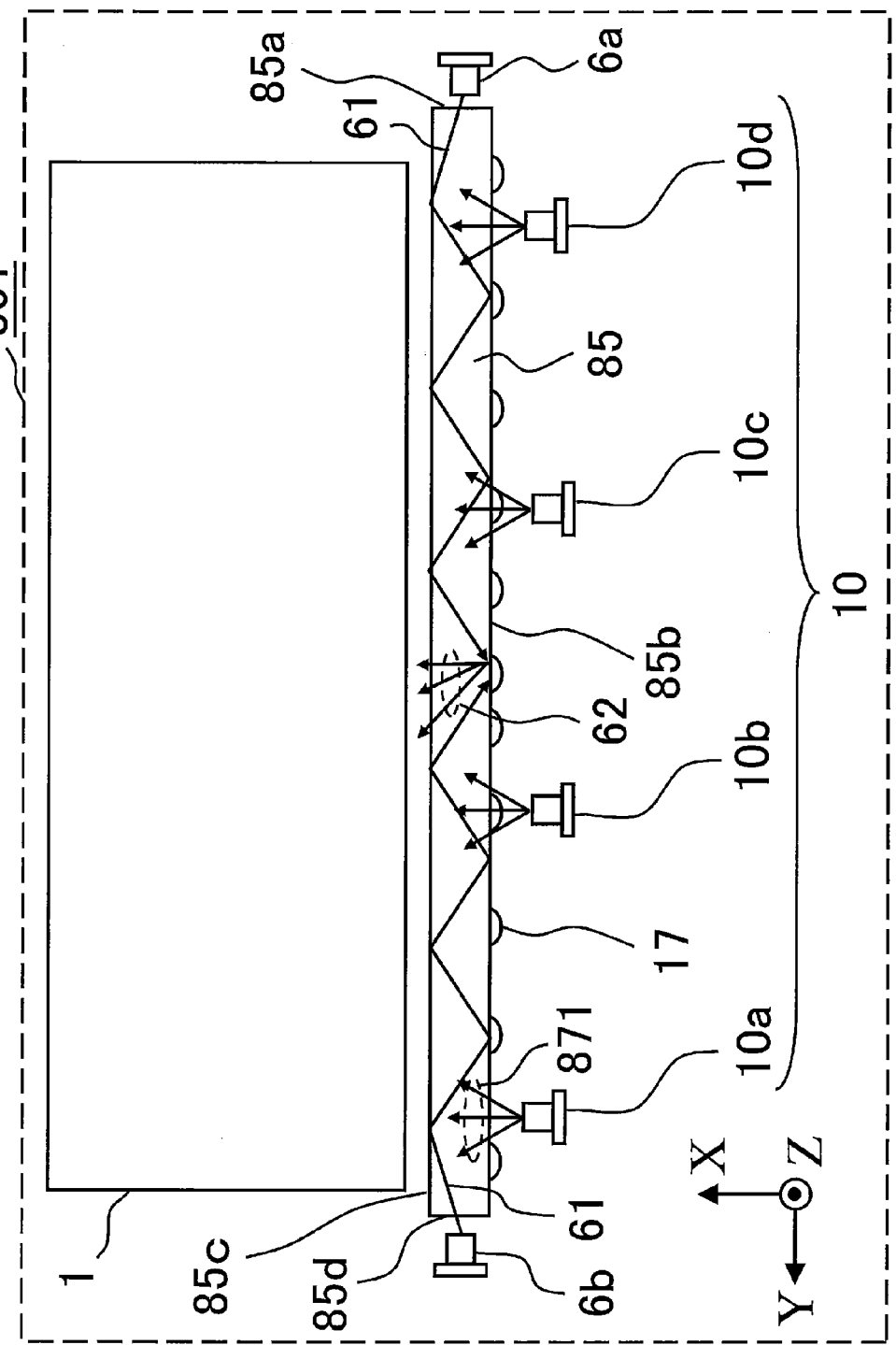
FIG. 17 is a diagram schematically showing structure of a liquid crystal display apparatus in a fifth embodiment.

FIG. 17 is a diagram schematically showing structure of a liquid crystal display apparatus (transmission-type liquid crystal display apparatus) 801 according to a fifth embodiment of the present invention. The liquid crystal display apparatus 801 in the fifth embodiment differs from the liquid crystal display apparatus 800 in the fourth embodiment in that two light sources 6, which are first light sources, are provided and disposed so as to face two end faces having short sides of light guide element 85. A light guide plate 811 is disposed in a negative Z-axis direction of a liquid crystal display element 1. Otherwise, the liquid crystal display apparatus 801 in the fifth embodiment is basically the same as the liquid crystal display apparatus 800 in the fourth embodiment. In FIG. 17, components identical to or corresponding to the components of the liquid crystal display apparatus 800 described in the fourth embodiment are denoted by the same reference numerals.

Figure 18:
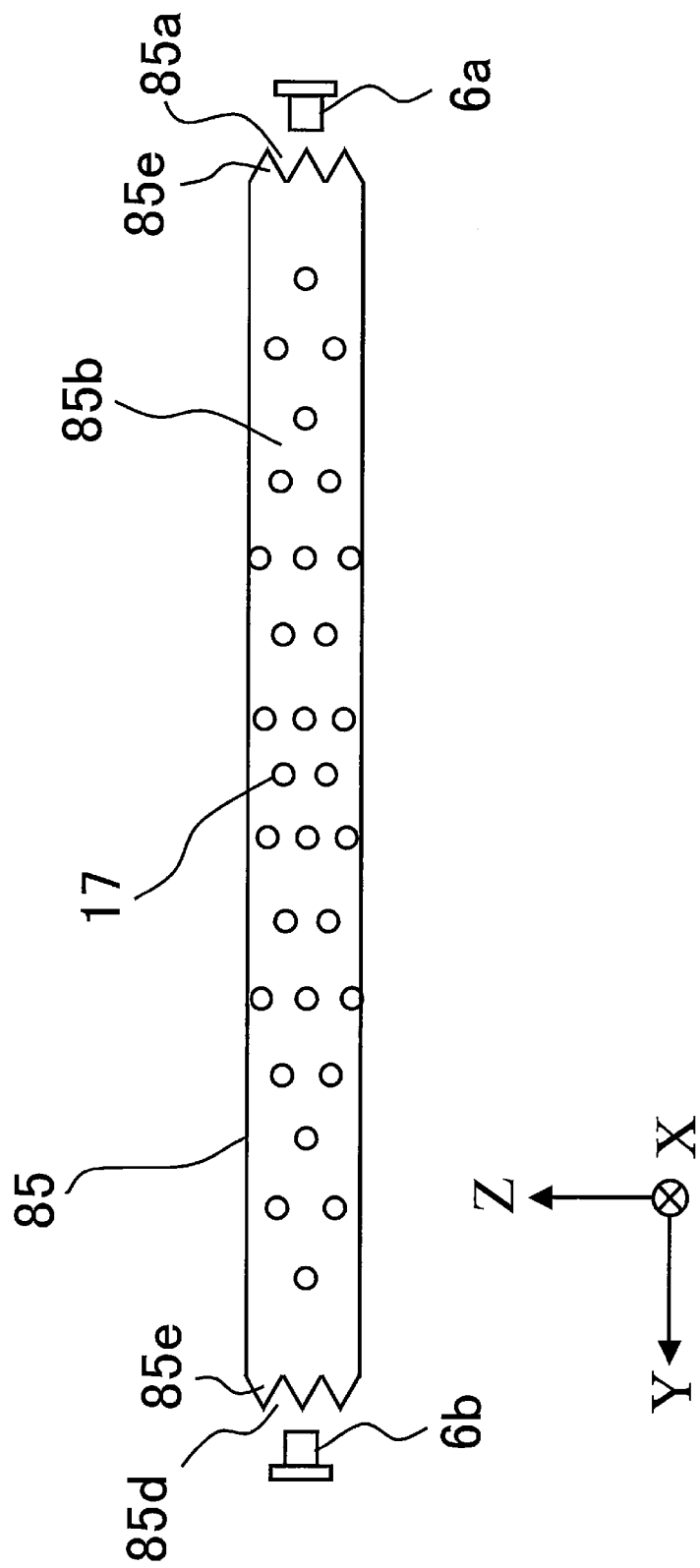
FIG. 18 is a diagram schematically showing structure of a light guide element in the fifth embodiment.

FIG. 18 is a diagram schematically showing structure of the light guide element 85 according to the fifth embodiment of the present invention and shows the side of a light incidence face 85*b* of the light guide element 85. The light incidence face 85*b* is a second light incidence face where light rays 871 emitted from the light source 10 is incident. Like the light guide element 5 described in the fourth embodiment, the light guide element 85 is formed by a transparent material. Like the light guide element 5 described in the fourth embodiment, the light guide element 85 is a bar-like member. The light incidence face 85*b* includes microscopic optical elements 17, which are optical elements. The light incidence face 85*b* is on the opposite side of a light output face 85*c* facing the light guide plate 811. The light incidence face 85*b* is a second light incidence face.

Light incidence faces 85*a* and 85*d* of the light guide element 85 include microscopic optical elements 85*e*. The microscopic optical elements 85*e* are plurality of triangular prisms arranged in a Z-axis direction in a Y-Z section. Light rays 61 emitted from light sources 6*a* and 6*b* pass through the microscopic optical elements 85*e*. At that time, light centered on the center of the divergence angle of the light ray 61 is converted to light having a wide angle with respect to the center of the divergence angle. The light ray 61 is given a wide angular luminance distribution in the Y-Z plane when it passes through the microscopic optical elements 85*e*. The light rays 61 having a wide angular luminance distribution pass through the optical element 15 and enter the light guide plate 811 as illuminating light rays 62. The illuminating light rays 62 have a wide divergence angle in the direction of thickness of the light guide plate 811. Accordingly, light ray extraction efficiency of the light guide plate 811 with respect to the illuminating light rays 62 is improved. In the liquid crystal display apparatus 801 and a backlight unit included in the liquid crystal display apparatus 801, the luminance can be improved. Further, power consumption of the liquid crystal display apparatus 801 and the backlight unit included in the liquid crystal display apparatus 801 can be reduced. A planar spatial luminance distribution of planar light generated by the illuminating light rays 62 passing through the light guide plate 811 is uniformed. Consequently, the illuminating light rays 62 and the light rays 871 emitted from the light source 10 can be mixed evenly. Therefore, the liquid crystal display apparatus 801 can suppress unevenness in color and can provide high-quality images. The microscopic optical elements 85*e* can be used in the light guide element 5 in the fourth embodiment, shown in FIGS. 12 and 16.

The disposition density of the microscopic optical elements 17 varies with respect to the position in the traveling direction (Y-axis direction in FIGS. 17 and 18) of the light rays 61 emitted from the light sources 6*a* and 6*b*. More specifically, the density varies continuously from low to high, from the vicinity of the light incidence face 85*a* and the light incidence face 85*d* of the light guide element 85 to the central position of the light guide element 85 in the Y-axis direction. The light sources 6*a* and 6*b* are first light sources. The light incidence face 85*a* is a first light incidence face. The light incidence face 85*d* is a third light incidence face.

The red light rays 61 emitted from the light sources 6*a* and 6*b* travel in the light guide element 85 by total reflection. The cyan light rays 871 emitted from a plurality of light emitting elements 10*a*, 10*b*, 10*c*, and 10*d* enter the light guide element 85 from the light incidence face 85*b* of the light guide element 85. The light rays 871 are diffused when they pass through the microscopic optical elements 17. The light rays 871 are next mixed with the red illuminating light rays 62 emitted from the light sources 6*a* and 6*b*. Then, the illuminating light rays 62 and the light rays 871 are emitted from the light output face 85*c* of the light guide element 85 toward the light guide plate 811.

The light rays 61 entering the light guide element 85 from the light incidence faces 85*a* and 85*d* are gradually directed toward the light guide plate 811 by the microscopic optical elements 17. So, the amount of light in the light guide element 85 decreases as it approaches the central position in the Y-axis direction. The disposition density of the microscopic optical elements 17, however, increases, as it approaches the central position of the light guide element 85 in the Y-axis direction. This increases the proportion of amount of light entering the microscopic optical elements 17 with respect to the amount of light of the light rays 61 traveling in the light guide element 85. As a result, the red illuminating light ray 62 emitted from the light output face 85*c* of the light guide element 85 toward the light guide plate 811 become light having a linear shape in a cross section perpendicular to the light traveling direction (a light ray similar to a light ray emitted from a linear light source), having a uniform spatial luminance distribution in the Y-axis direction.

The light source 10 that emits cyan light rays 871 has the same structure as the light source 10 in the fourth embodiment. Unlike the light sources 6*a* and 6*b*, the light emitting elements constituting the light source 10 are light emitting elements having a large divergence angle. Like the red light rays 61 (illuminating light rays 62) emitted from the light sources 6*a* and 6*b*, the light rays 871 become light having a linear shape in a cross section perpendicular to the light traveling direction (a light ray similar to a light ray emitted from a linear light source), having a uniform spatial luminance distribution in the Y-axis direction, just by passing through the light guide element 85.

The light guide element 85 is disposed so as to face the light incidence face 811a of the light guide plate 811. The illuminating light rays 62 and the light rays 871 are emitted from the light output face 85c of the light guide element 85 toward the light guide plate 811, as light having a linear shape in a cross section perpendicular to the light traveling direction (a light ray similar to a light ray emitted from a linear light source). The illuminating light rays 62 here are red rays (light rays 61) output from the light sources 6a and 6b. The light rays 871 are cyan light rays (light rays 871) emitted from the light source 10. A controller 51 adjusts the proportion of the luminance of the red light rays 61 emitted from the light source 6 and luminance of the cyan light rays 871 emitted from the light source 10 by controlling light source drivers 53a and 53b separately. The light guide element 85 functions as a white linear light source. The light incidence face 811a is an end face of the light guide plate 811 in the negative X-axis direction. The light output face 85c is a face facing the light guide plate 811.

The other components of the liquid crystal display apparatus 801 in the fifth embodiment are the same as those of the liquid crystal display apparatus 800 in the fourth embodiment. The other components include the liquid crystal display element 1, a first optical sheet 31, a second optical sheet 32, the light guide plate 811, and a light reflection sheet 15. In the fifth embodiment, an optical element having the effect of refracting light in the fourth embodiment, such as the prism 851, shown in FIG. 16, can be used.

Generally, as a screen of a liquid crystal display apparatus increases in size, a backlight unit is demanded to emit illuminating light rays having a greater amount of light. In order to increase the amount of light of illuminating light rays emitted from the backlight unit while maintaining white balance, it is generally necessary to increase the emission intensity of light sources or to increase the number of light sources. It is, however, hard to arrange light sources on the same light incidence face 85a of a square-prism-shaped light guide element and have them enter the light rays. The reason is that a length of the side of the light guide element in the X-axis direction must be reduced in order to reflect the highly directional light rays 61 at a short optical distance. The length of the side in the Z-axis direction must be smaller than a thickness of the light guide plate 811 so that optical efficiency can be improved. Therefore, it is hard to increase the number of light sources.

According to the fifth embodiment, the light sources 6a and 6b can be disposed on the light incidence faces 85a and 85d at both ends of the light guide element 85. Since the two light sources 6a and 6b can be disposed on the single light guide element 85 in the fifth embodiment, even if the liquid crystal screen increases in size, a sufficient amount of light can obtained from the backlight unit while balance is maintained.

Sixth Embodiment

Figure 19:
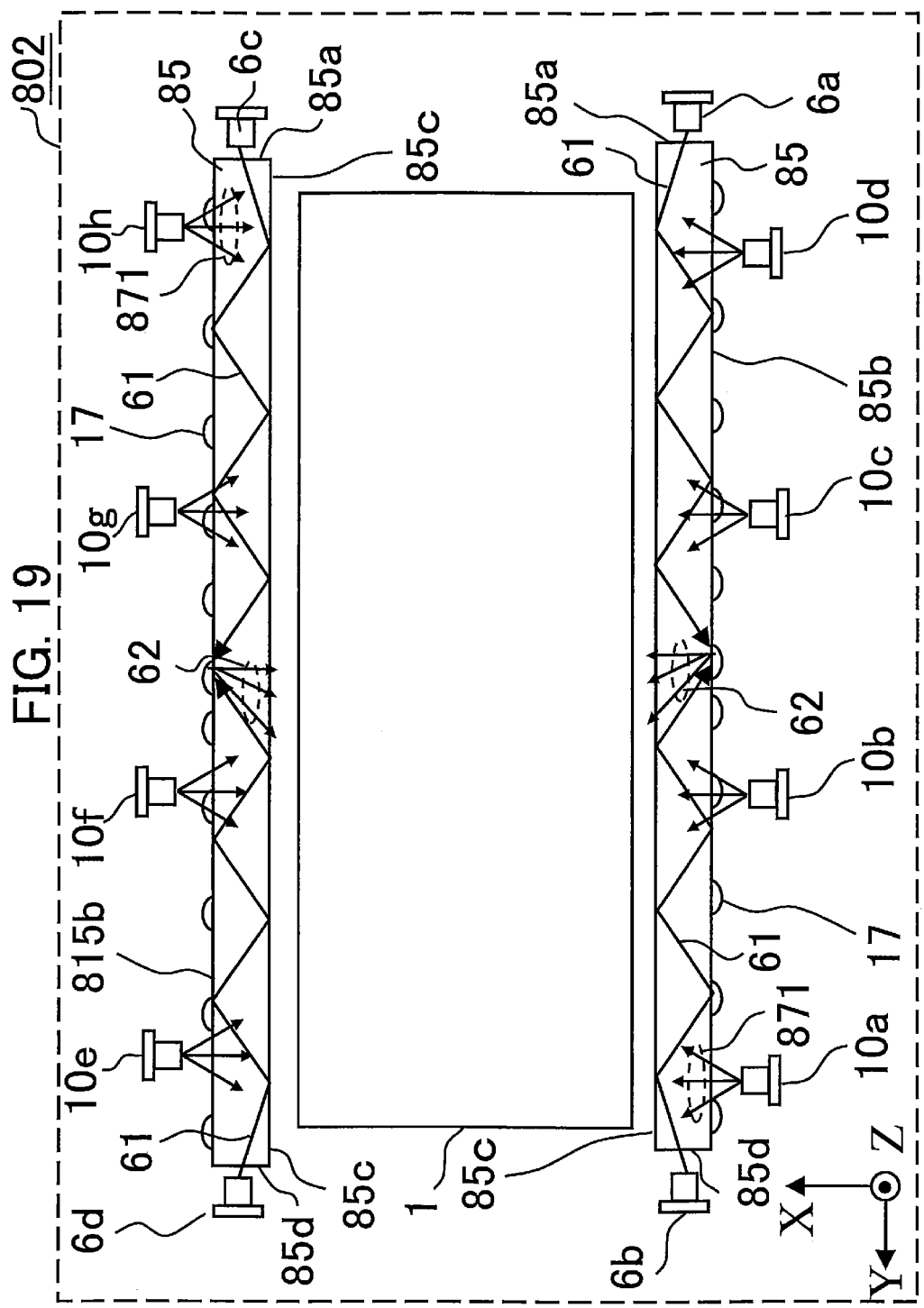
FIG. 19 is a diagram schematically showing structure of a liquid crystal display apparatus in a sixth embodiment.

FIG. 19 is a diagram schematically showing structure of a liquid crystal display apparatus (transmission-type liquid crystal display apparatus) 802 according to a sixth embodiment of the present invention. The liquid crystal display apparatus 802 in the sixth embodiment differs from the liquid crystal display apparatus 801 in the fifth embodiment in that two light guide elements 85 are accompanied by light sources 6a and 6b or light sources 6c and 6d, which are first light source, and optical elements (light sources) 10a, 10b, 10c, and 10d and optical elements (light sources) 10e, 10f, 10g, and 10h, which are second light sources, and face each other on the opposite sides of a liquid crystal display element 1. Otherwise, the liquid crystal display apparatus 802 of the sixth embodiment is basically the same as the liquid crystal display apparatus 801 of the fifth embodiment. In FIG. 19, the components identical to or corresponding to the components of the liquid crystal display apparatus 801 described in the fifth embodiment are denoted by the same reference numerals.

As shown in FIG. 19, the two light guide elements 85 are disposed on both sides of a light guide plate 811 in a X-axis direction. The light guide plate 811 is placed in a negative Z-axis direction of the liquid crystal display element 1. As for the light sources 6a and 6c, one light source is disposed on a single light incidence face 85a to face the light incidence face 85a of a different light guide element 85. As for the light sources 6b and 6d, one light source is disposed on a single light incidence face 85d to face the light incidence face 85d of a different light guide element 85. In other words, each of the four light sources 6a, 6b, 6c, and 6d are disposed on each of the light incidence faces 85a and 85d, to face the light incidence faces 85a and 85d. The light incidence faces 85a and 85d have short sides of the light guide element 85.

In a negative X-axis direction of the light guide element 85 disposed in the negative X-axis direction of the light guide plate 811, the plurality of light emitting elements 10a, 10b, 10c, and 10d are disposed so as to face a light incidence face 85b. In a positive X-axis direction of the light guide element 85 disposed in the positive X-axis direction of the light guide plate 811, the plurality of light emitting elements 10e, 10f, 10g, and 10h are disposed so as to face the light incidence face 85b.

Light rays 61 emitted from the light sources 6a, 6b, 6c, and 6d travel in the light guide element 85. The light rays 61 entering microscopic optical elements 17 are refracted toward the light guide plate 811 and output as illuminating light rays 62 from a light output face 85c toward the light guide plate 811. Light rays 871 emitted from the light emitting elements 10a, 10b, 10c, 10d, 10e, 10f, 10g, and 10h enter the light guide element 85 from the light incidence face 85b and exit from the light output face 85c toward the light guide plate 811.

According to the sixth embodiment, the four light sources 6a, 6b, 6c, and 6d can be disposed, which are four times the light sources that can be disposed in the fourth embodiment. According to the sixth embodiment, the light sources are twice the light sources that can be disposed in the fifth embodiment. Accordingly, the sixth embodiment is effective for improving luminance in the liquid crystal display apparatus 802 and a backlight unit included in the liquid crystal display apparatus 802.

Figure 20:
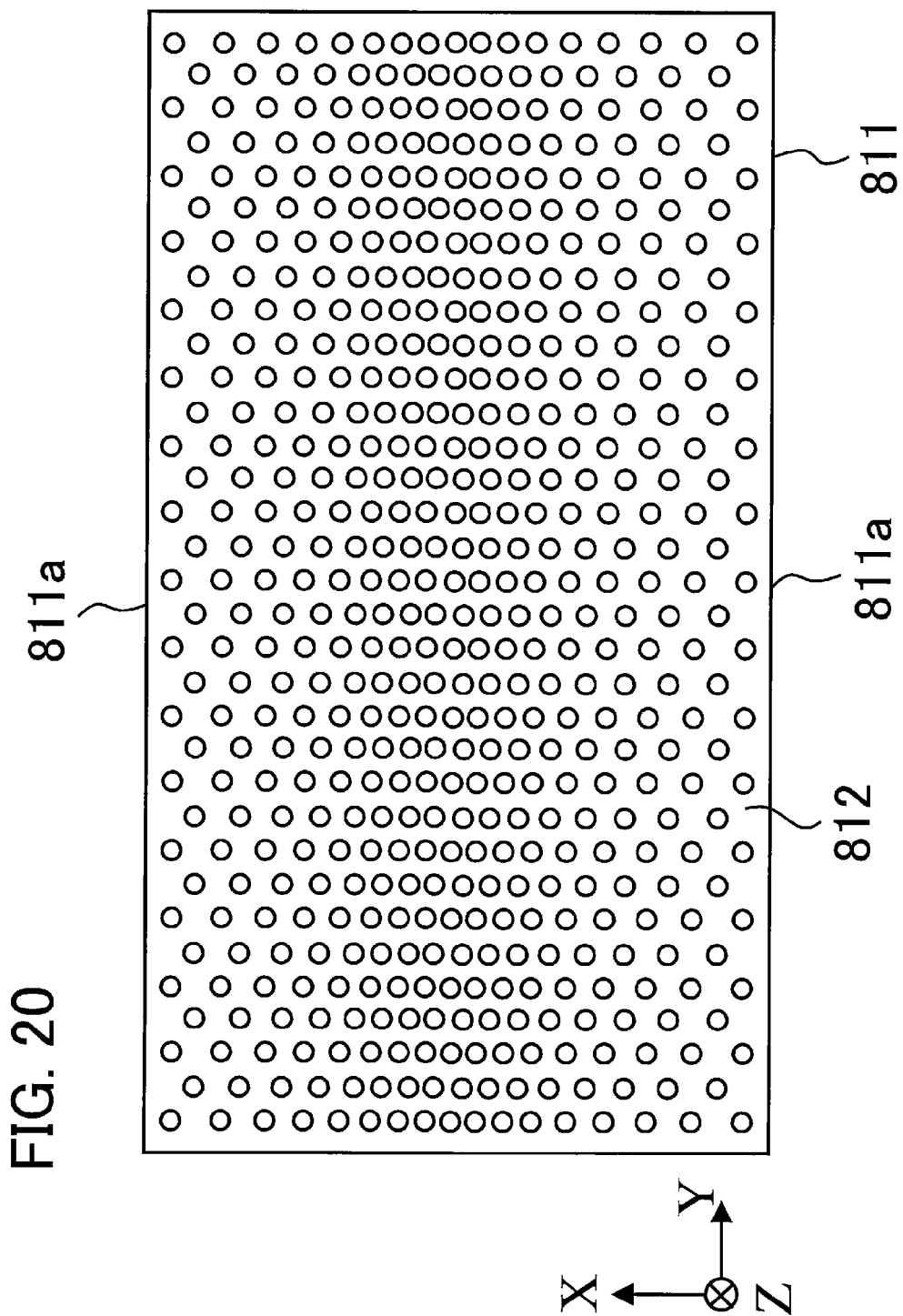
FIG. 20 is a diagram schematically showing a disposition of microscopic optical elements on a light guide plate in the sixth embodiment.

The light guide plate 811 in the sixth embodiment is formed by a transparent material. The light guide plate 811 is a plate-like member having a thickness of 4 mm, for example. The light guide plate 811 includes an optical diffuse reflective portion 812 for emitting the light rays 61 and 871 emitted from the light sources 6a, 6b, 6c, 6d and the light emitting elements 10a, 10b, 10c, 10d, 10e, 10f, 10g, and 10h, which are disposed in its back surface, toward a back surface 1b of the liquid crystal display element 1. As shown in FIG. 20, the optical diffuse reflective portion 812 can be configured by printing spots of a diffuse reflective material on a back surface of the light guide plate 811, for example. The printed spots of the diffuse reflective material are distributed so that the density is low in the vicinity of a light incidence face 811a and the density increases as the distance from the two light guide elements 85 increase, approaching the center of the light guide plate 811 in the X-axis direction. The light incidence face 811a is an end face where the illuminating light rays 62 and the light rays 871 emitted from the two light guide elements 85 are incident. Accordingly, the planar spatial luminance distribution in an X-Y plane of illuminating light ray 810 emitted from the light guide plate 811 can be uniformed. The illuminating light ray 810 is an illuminating light ray including a ray 809 formed by mixing the illuminating light ray 62 and the light ray 871.

The other components of the sixth embodiment are the same as the components of the liquid crystal display apparatus 801 described in the fifth embodiment. The other components include the liquid crystal display element 1, a first optical sheet 31, a second optical sheet 32, the light guide plate 811, and a light reflection sheet 15. In the sixth embodiment, an optical element having the effect of refracting light, such as the prism 851, in the fourth embodiment shown in FIG. 16, can be used.

The backlight unit according to the sixth embodiment can include a laser light source and many other light sources. The backlight unit according to the sixth embodiment can maintain white balance even if the liquid crystal display element 1 becomes larger in size. The backlight unit according to the sixth embodiment can provide a sufficient amount of light. Accordingly, the backlight unit according to the sixth embodiment is effective for increasing the luminance of the image display surface of the liquid crystal display apparatus 802. The backlight unit according to the sixth embodiment is effective for increasing luminance of the light output face of the backlight unit.

Four light guide elements 85 can be disposed so as to face any of the four sides of the light guide plate, which will not be illustrated in a drawing. For example, the density of the diffuse reflective material applied on the back surface of the light guide plate 811 is varied from low to high, from the sides of the light guide plate 811 to the center. With this configuration, a backlight unit that can discharge a greater amount of light while maintaining white balance can be provided.

In the description of the embodiments, terms indicating positional relationships between components such as "parallel" and "perpendicular" and terms describing shapes of components have been used. In the description of the embodiments, words such as "approximately" and "nearly" are added, as in "nearly square," "approximately 90 degrees," and "almost parallel." These words express that a range including the manufacturing tolerance and variations in assembly are covered. Even if a word like "approximately" is not included in the description of claims, the range including the manufacturing tolerance and variations in assembly should be covered. If a word like "approximately" is included in the description of claims, it means that the range including the manufacturing tolerance and variations in assembly are covered.

INDUSTRIAL APPLICABILITY

As described above, the present invention is useful for liquid crystal display apparatuses and backlight units having a uniform planar spatial luminance distribution, and a high-picture-quality, stylish liquid crystal display apparatus can be provided.

EXPLANATION OF REFERENCE CHARACTERS 1 liquid crystal display element; 1a display surface; 1b back surface; 15 light reflection sheet; 2, 7 first backlight unit; 3, 4 second backlight unit; 31, 32 optical sheet; 5, 85 light guide element; 5a, 5b, 85a, 85b, 85d, 811a light incidence face; 5c, 85c light output face, 100, 600, 700, 800, 801, 802 liquid crystal display apparatus; 200a, 200b, 77a, 77b planar laser light source unit; 300, 301, 302, 303 backlight device; 6, 6a, 6b, 6c, 6d, 10, 20a, 20b, 70a, 70b light source (light emitting elements); 12, 812 optical diffuse reflective portion; 13 incident light ray; 14, 33a, 33b, 37a, 37b, 810, 62 illuminating light ray; 21a, 21b, 11, 71a, 71b, 811 light guide plate; 22a, 22b, 72a, 72b light (outgoing light ray); 61, 809, 871 light ray; 23a, 23b, 73a, 73b end face; 24a, 24b, 74a, 74b back surface; 25a, 25b, 75a, 75b, 85e, 850, 17 microscopic optical element; 851 prism; 26a, 26b, 76a, 76b optical transmission portion; 27a, 27b, 78a, 78b optical element portion; 51 controller; 52 liquid crystal display element driver; 53a, 53b light source driver; 54 video signal; 55 liquid crystal display element control signal; 56a, 56b light source control signal; 80p, 81p laser light ray; 80, 81 laser light emitting element; 40, 41, 42, 43, 44, 45, 80q, 81q, 82q luminance distribution.

What is claimed is:

1. A planar light source device comprising:
   a first light source for emitting a first light ray which has a punctate spatial luminance distribution when the first light ray is emitted;
   a second light source for emitting a second light ray;
   a first spatial luminance distribution conversion portion for receiving the first light ray, changing the first light ray from the punctate spatial luminance distribution to a linear spatial luminance distribution, and then exiting the first light ray;
   a second spatial luminance distribution conversion portion for receiving the first light ray having the linear spatial luminance distribution and the second light ray, changing a spatial luminance distribution of the received first light ray and a spatial luminance distribution of the received second light ray to a planar spatial luminance distribution, and then exiting the first light ray and the second light ray as planar light; and
   an optical element disposed on an optical path from a light emitting surface of the first light source to a light incidence face of the second light source where the first light ray enters, the optical element spreading a divergence angle of the first light ray in the slow-axis direction on the optical path; wherein:
   the first light ray is a laser light;
   the second light ray has a divergence angle larger than the divergence angle of the first light ray when the first light ray is emitted from the first light source; and
   a slow-axis direction of the first light ray entering the second spatial luminance distribution conversion portion is parallel to an outgoing direction of the planar light.

2. The planar light source device according to claim 1, wherein a dominant wavelength of the first light ray is any wavelength in a wavelength band of 630 nm to 650 nm.

3. A liquid crystal display apparatus comprising the planar light source device according to claim 1 as a backlight device.

4. The planar light source device according to claim 1 wherein:
   the first spatial luminance distribution conversion portion is a rectangular prism-shaped light guiding element;
   the second spatial luminance distribution conversion portion is a plate-like light guide plate;
   the light guiding element is disposed in a same plane as the light guide plate;
   a light exit face of the light guiding element faces a light incidence face of the light guide plate;

the first light source is disposed to face at least one of two faces each formed by short sides formed in both ends of the light guiding element; and the second light source is disposed so as to face one of side, faces formed by long sides and short sides of the light guiding element.

5. The backlight device according to claim 1, wherein the first spatial luminance distribution conversion portion transmits the second light ray.

6. The planar light source device according to claim 1 wherein a slow-axis direction of the first light ray entering the light guiding element is parallel to an outgoing direction of the planar light.

* * * * *